United States Patent
Brown et al.

(10) Patent No.: US 12,410,782 B2
(45) Date of Patent: Sep. 9, 2025

(54) ACTUATOR ASSEMBLY

(71) Applicant: CAMBRIDGE MECHATRONICS LIMITED, Cambridge (GB)

(72) Inventors: Andrew Benjamin Simpson Brown, Cambridge (GB); Stephen Matthew Bunting, Cambridge (GB); Robin Eddington, Cambridge (GB); Oliver Hart, Cambridge (GB); James Howarth, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 18/713,045

(22) PCT Filed: Nov. 24, 2022

(86) PCT No.: PCT/GB2022/052977
§ 371 (c)(1),
(2) Date: May 23, 2024

(87) PCT Pub. No.: WO2023/094813
PCT Pub. Date: Jun. 1, 2023

(65) Prior Publication Data
US 2025/0027485 A1     Jan. 23, 2025

(30) Foreign Application Priority Data

Nov. 24, 2021 (GB) ...................................... 2116960
Nov. 24, 2021 (GB) ...................................... 2116961

(51) Int. Cl.
*F03G 7/06* (2006.01)
*G03B 5/04* (2021.01)
*G03B 13/36* (2021.01)

(52) U.S. Cl.
CPC ....... *F03G 7/06143* (2021.08); *F03G 7/0665* (2021.08); *G03B 5/04* (2013.01); *G03B 13/36* (2013.01); *G03B 2205/0076* (2013.01)

(58) Field of Classification Search
CPC .................................. H02N 11/00; F03G 7/06
See application file for complete search history.

(56) References Cited

U.S. PATENT DOCUMENTS

2022/0059712 A1\* 2/2022 Barbot .................... H02S 30/20

FOREIGN PATENT DOCUMENTS

EP        3650691 A1    5/2020
WO   2020/120997 A1    6/2020
(Continued)

OTHER PUBLICATIONS

Great Britain Search Report and Written Opinion received for GB Application No. 2116960.2, mailed on Apr. 7, 2022, 6 pages.
(Continued)

*Primary Examiner* — Shafiq Mian
(74) *Attorney, Agent, or Firm* — Van Hoven PC; Stefan D. Osterbur; Joshua Van Hoven

(57) ABSTRACT

An actuator assembly comprising: a support structure comprising a first friction surface; a movable part comprising a second friction surface engaging the first friction surface; one or more SMA wires arranged, on contraction, to move the movable part relative to the support structure to any position within a range of movement; a biasing arrangement arranged to bias the first and second friction surfaces against each other with a normal force, thereby generating a static frictional force that constrains the movement of the movable part relative to the support structure at any position within the range of movement when the one or more SMA wires are not contracted; wherein the one or more SMA wires are (Continued)

arranged, on contraction, to reduce the normal force between first and second friction surfaces.

20 Claims, 12 Drawing Sheets

(56) References Cited

FOREIGN PATENT DOCUMENTS

| | | |
|---|---|---|
| WO | 2020/183360 A1 | 9/2020 |
| WO | 2021/130481 A1 | 7/2021 |

OTHER PUBLICATIONS

Great Britain Search Report and Written Opinion received for GB Application No. 2116961.0, mailed on Apr. 7, 2022, 3 pages.
International Search Report and Written Opinion received for PCT Patent Application No. PCT/GB2022/052977, mailed on Jan. 31, 2023, 9 pages.

* cited by examiner

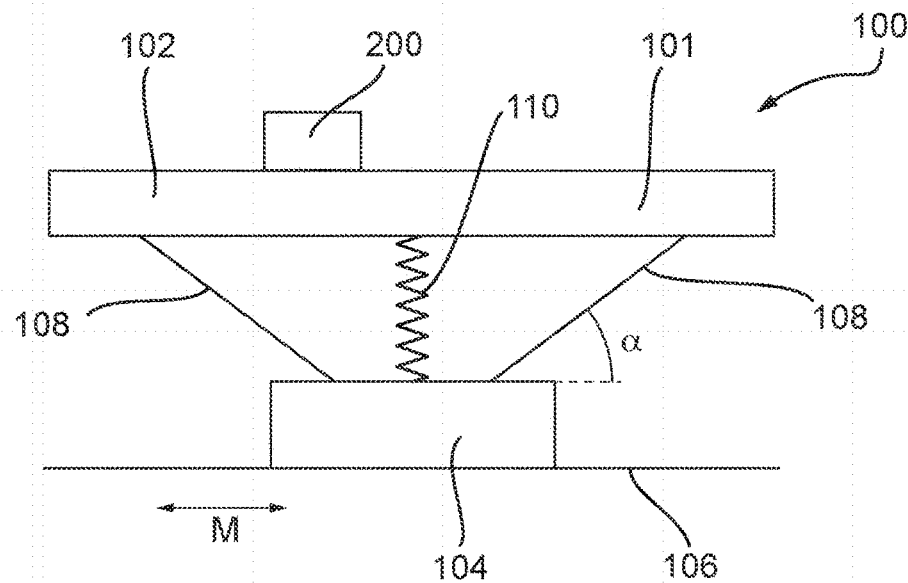
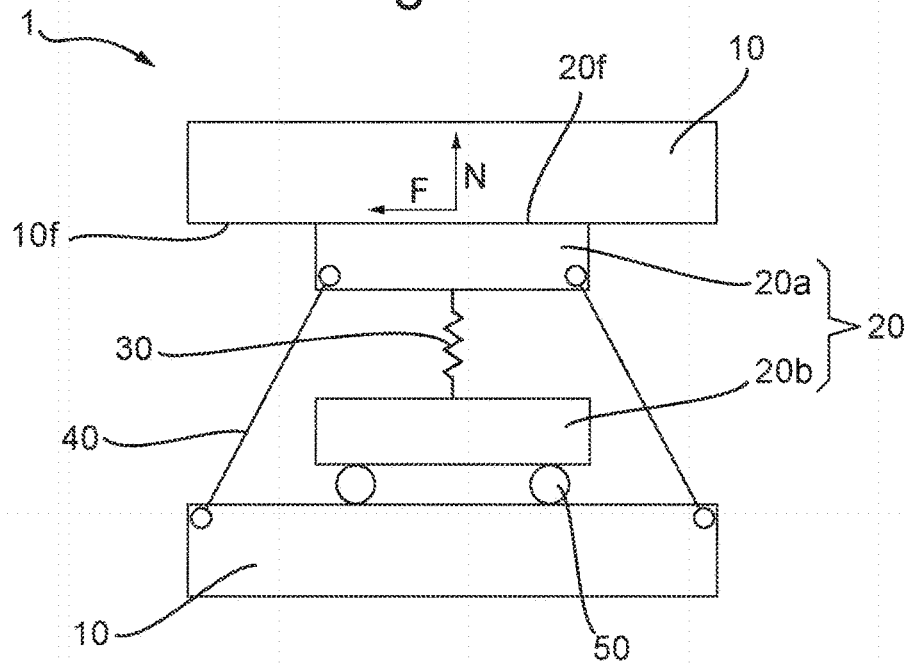

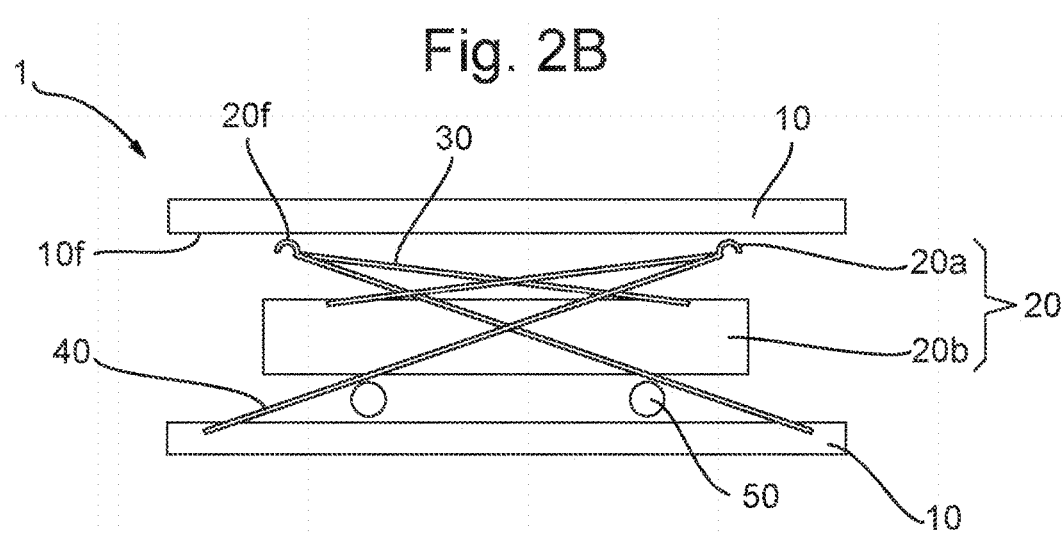
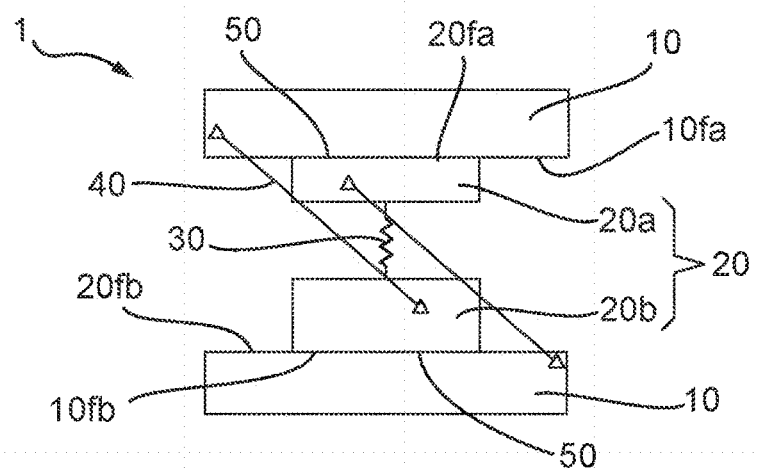
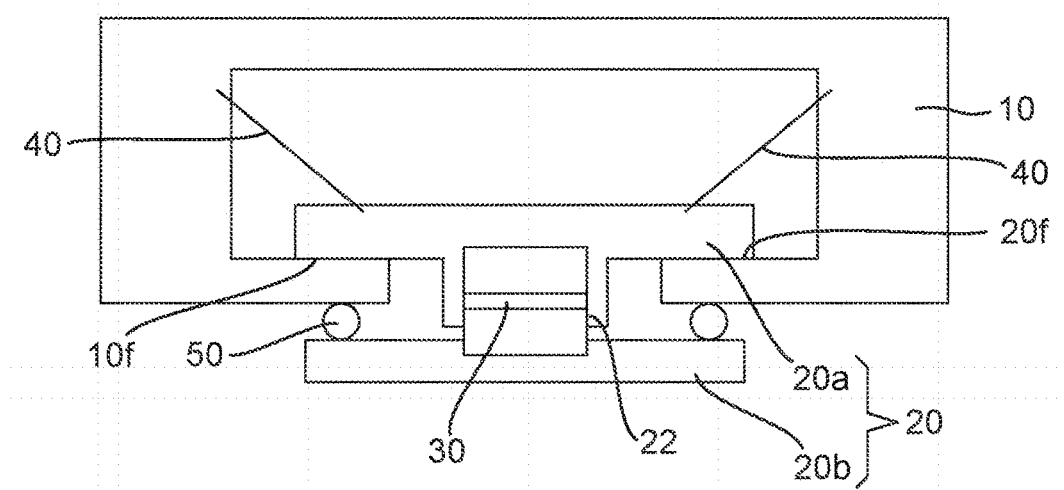

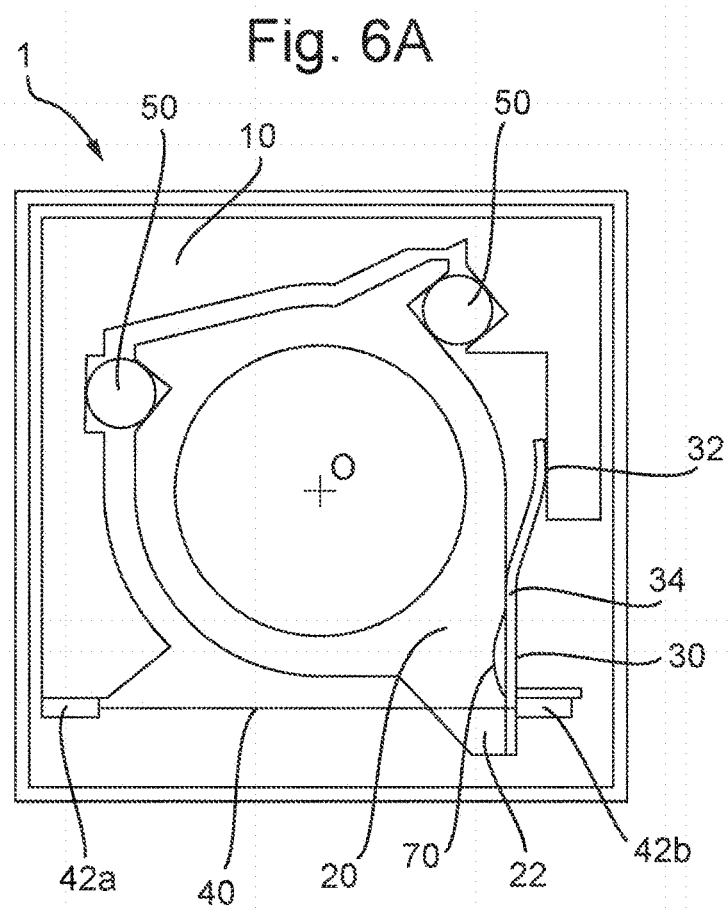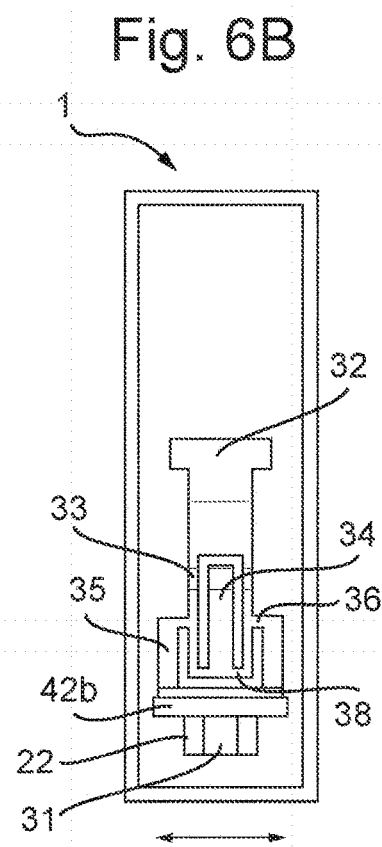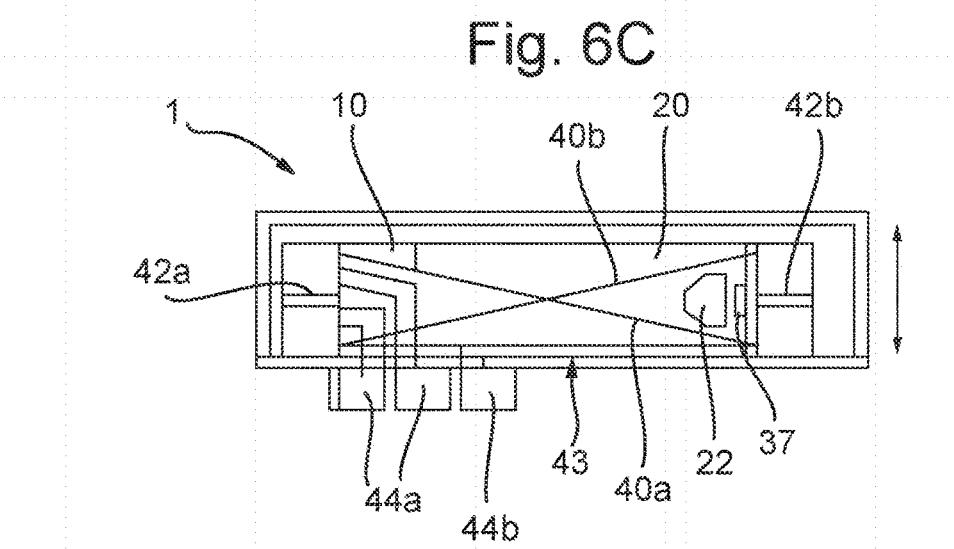

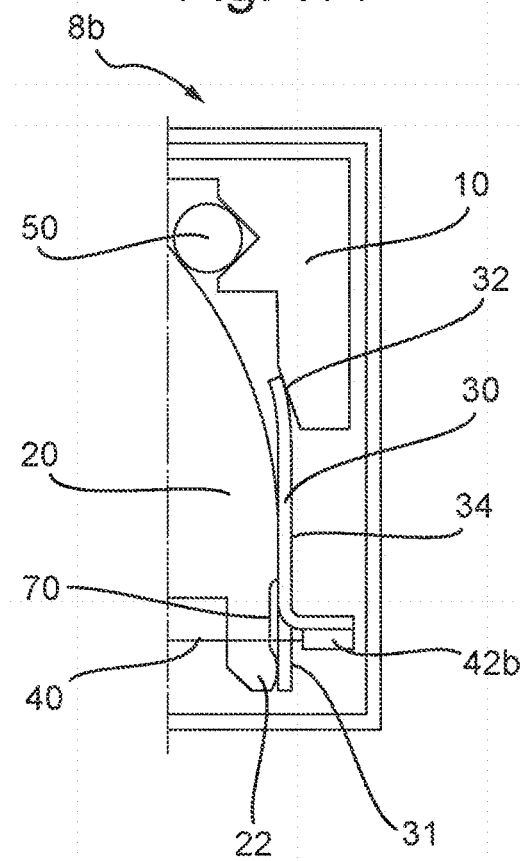
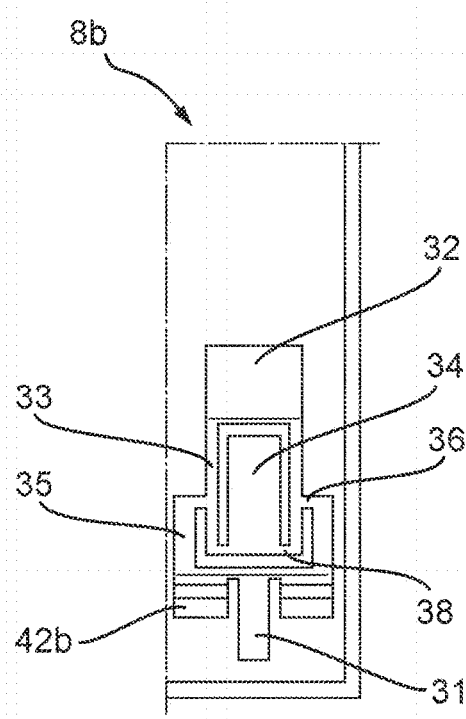

ACTUATOR ASSEMBLY

CROSS-REFERENCE TO RELATED APPLICATIONS

This application is a national stage application under 35 U.S.C. § 371 of International Application No. PCT/GB2022/052977, filed Nov. 24, 2022, which claims priority of GB Patent Applications 2116960.2, filed Nov. 24, 2021, and 2116961.0, filed Nov. 24, 2021, the disclosures of each of which are hereby incorporated by reference herein in their entireties.

FIELD

The present application generally relates to an actuator assembly, and in particular to a shape memory alloy (SMA) actuator assembly.

BACKGROUND

Shape memory alloy (SMA) actuators are used in camera assemblies for effecting a range of motions of a lens carriage or an image sensor. For example, WO 2013/175197 A1 describes a camera with an SMA actuator assembly having SMA wires that are configured to, on contraction, move the movable part in directions perpendicular to an optical axis to provide optical image stabilization (OIS). This actuator assembly includes flexure arms that provide a lateral biasing force that biases a lens assembly towards a central position. However, in some cases where it is desirable to hold the lens assembly at a given position, such a known actuator assembly would have relied on continuously energising the SMA wires over a prolonged period of time. Such an arrangement not only consumes energy during the holding period, but the stability of the lens carriage may also be susceptible to sudden movements and other external factors.

WO2020/120997 A1 discloses various means for retaining a lens carriage at a given position by friction. In particular, a lens carriage is biased against a surface of a support structure by a biasing element to hold the lens carriage in any given position when the SMA wires are not energised. Upon actuation, the SMA wires act against the biasing element to reduce frictional forces, thereby enabling the lens carriage to be driven to a new position.

SUMMARY

The present invention provides various means for retaining a moveable part at the desired position when the SMA wires in an SMA actuator assembly are not energised, thereby eliminating the need for continuously energising the SMA actuator as required by known techniques.

According to the present invention, there is provided an actuator assembly comprising: a support structure comprising a first friction surface; a movable part comprising a second friction surface engaging the first friction surface; one or more SMA wires arranged, on contraction, to move the movable part relative to the support structure to any position within a range of movement; a biasing arrangement arranged to bias the first and second friction surfaces against each other with a normal force, thereby generating a static frictional force that constrains the movement of the movable part relative to the support structure at any position within the range of movement when the one or more SMA wires are not contracted, wherein the biasing arrangement is comprised by the movable part or by the support structure so as to move with the movable part or remain static relative to the support structure, and is arranged to apply the normal force only in a direction perpendicular to the range of movement at any position within the range of movement; wherein the one or more SMA wires are arranged, on contraction, to reduce the normal force between first and second friction surfaces.

The frictional force constrains movement of the movable part relative to the support structure when the SMA wires are not energized. The movable part may be held in position without power consumption, thus reducing the overall power consumption of the actuator assembly. Upon contraction of the SMA wires, the normal force between first and second friction surfaces reduces, and so the frictional force reduces as well. The reduction in frictional force assists in overcoming the frictional force such that the movable part may be moved by the SMA wires. The biasing arrangement is comprised by the movable part or support structure, such that the normal force is applied only in a direction perpendicular to the range of movement at any position within the range of movement. This ensures that the biasing arrangement does not oppose the stresses in the SMA wires used to move the movable part.

According to the present invention, there is also provided an actuator assembly comprising: a support structure comprising a first friction surface; a movable part comprising a second friction surface engaging the first friction surface; a bearing arrangement for bearing movement of the movable part relative to the support structure within a range of movement; one or more SMA wires arranged, on contraction, to move the movable part relative to the support structure to any position within the range of movement; a biasing arrangement arranged to bias the first and second friction surfaces against each other with a normal force, thereby generating a static frictional force that constrains the movement of the movable part relative to the support structure at any position within the range of movement when the one or more SMA wires are not contracted, wherein the one or more SMA wires are arranged, on contraction, to lift the movable part off the first friction surface such that the movable part bears on the bearing arrangement.

The frictional force constrains movement of the movable part relative to the support structure when the SMA wires are not energized. The movable part may be held in position without power consumption, thus reducing the overall power consumption of the actuator assembly. Upon contraction of the SMA wires, the movable part lifts off the first friction surface, thus eliminating the frictional force that keeps the movable part in position when the SMA wires are not powered. The movable part may thus more readily be moved by the SMA wires within the range of movement. After lift-off from the first friction surface, the movable part bears only on the bearing arrangement, thus ensuring that movement of the movable part is guided by the bearing arrangement. This makes controlled movement of the movable part by the SMA wires more accurate and reliably compared to a situation in which the movable part is suspended solely by the SMA wires after lift-off.

According to the present invention, there is also provided an actuator assembly comprising a support structure comprising a first friction surface; a movable part comprising a second friction surface engaging the first friction surface; one or more SMA wires arranged, on contraction, to move the movable part relative to the support structure to any position within a range of movement; a biasing arrangement arranged to bias the first and second friction surfaces against each other with a normal force, thereby generating a static frictional force that constrains the movement of the movable part relative to the support structure at any position within the range of movement when the one or more SMA wires are not contracted, wherein the one or more SMA wires are arranged, on contraction, to reduce the normal force between first and second friction surfaces.

According to the present invention, there is also provided an actuator assembly comprising a support structure comprising a first friction surface; a movable part comprising a second friction surface engaging the first friction surface; a helical bearing arrangement supporting the movable element on the support structure and arranged to guide helical movement of the movable element with respect to the support structure around a helical axis, wherein the helical bearing arrangement is formed by the first and second friction surfaces; and one or more SMA wires arranged, on contraction, to drive rotation of the movable element around the helical axis which the helical bearing arrangement converts into said helical movement; and biasing arrangement configured to load the helical bearing arrangement, thereby biasing the first and second friction surfaces against each other with a normal force and generating a static frictional force that constrains the movement of the movable part relative to the support structure at any position within the range of movement when the one or more SMA wires are not contracted, wherein the one or more SMA wires are arranged, on contraction, to reduce the normal force between first and second friction surfaces.

Further aspects of the present invention are set out in the dependent claims and clauses below, as well as in the detailed description.

BRIEF DESCRIPTION OF THE DRAWINGS

Certain embodiments of the present invention will now be described, by way of example only, with reference to the accompanying drawings, in which:

FIG. 1 is a schematic side view of a prior art actuator assembly;

FIGS. 2A-D are schematic side views of actuator assemblies according to embodiments of the present invention, in which the biasing arrangement is comprised by the movable part;

FIGS. 6A-C are schematic views of an embodiment of the present invention, in which the actuator assembly may act as an autofocus (AF) actuator assembly in a camera apparatus;

FIGS. 7A and B are schematic views of another embodiment of the present invention, in which the actuator assembly may act as an autofocus (AF) actuator assembly in a camera apparatus;

DETAILED DESCRIPTION

Figure 3A:
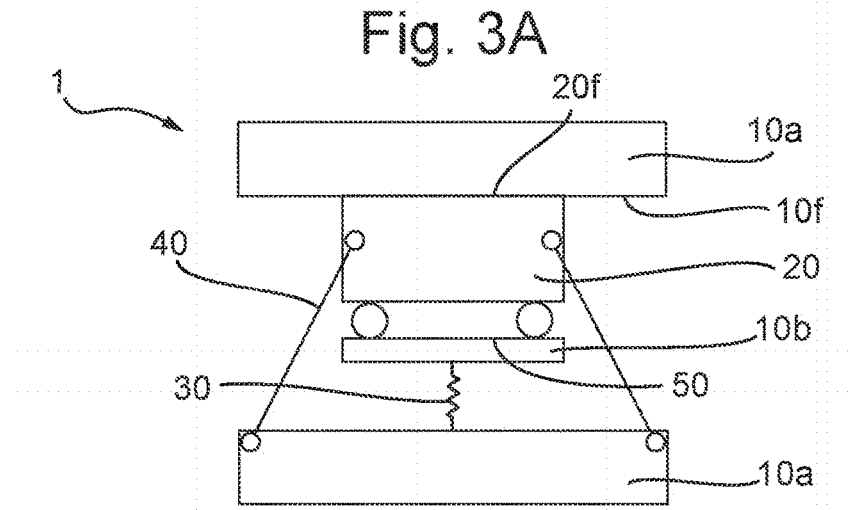
FIGS. 3A-C are schematic side views of actuator assemblies according to embodiments of the present invention, in which the biasing arrangement is comprised by the support structure.

The present invention provides various means for retaining a movable part of an actuator assembly at a desired position when the SMA wires are not energised, thereby eliminating the need for continuously energising the SMA wires as required by known techniques.

FIG. 1 schematically depicts a schematic diagram of an actuator assembly 100 as disclosed in WO2020/120997 A1. The actuator assembly 100 includes a static part 101 and a movable part 104. The movable part 104 is movable with respect to the static part 100. The static part 101 includes a body 102 and a surface 106 held in a fixed position with respect to the body 106, for example by a connecting portion (not shown). A gap is provided between the body 101 and the surface 106.

The movable part 104 is located in the gap between the body 102 and the surface 106. The movable part 104 is capable of movement relative to the static part 101 across the surface 106. In this example, the movable part 104 is capable of movement across the surface 106 in any direction in two dimensions.

The actuator assembly 100 also includes a spring 110 connected between the static part 101 and the movable part 104 by being connected at one end to the body 101 and at the other end to the movable part 104. The spring 110 extends orthogonally to the surface 104 in this example, although that is not essential. The spring 110 is held in compression and is therefore a resilient biasing element that acts as a biasing arrangement biasing the movable part 104 into contact with the surface 106. This generates a reaction between the movable part 104 and the surface 106, as well as generating frictional forces between the movable part 104 and the surface 106.

The first actuator assembly 100 also includes two SMA wires 108 connected at one end to the body 101 and at the other end to the movable part 104. Each SMA actuator wire 108 is inclined at an acute angle a of greater than 0° with respect to the surface 106 so as to apply a force, on contraction of the SMA actuator wire 108, with a component normal to the surface 106 that biases the movable part 104 away from the surface 106 and with a component parallel to the surface 106. A control circuit 200 in use applies drive signals to the SMA wires 108

In the actuator assembly 100 of FIG. 1, the spring 110 is connected between the static part 101 and the movable part 102. The spring 110 may thus give rise to a lateral force, i.e. a force parallel to the direction of movement, upon movement of the movable part 102 away from an initial, central position. Such a lateral force may make accurate and reliable control of the movement of the movable part 102 more complex. The lateral force may also oppose frictional forces between the movable part 102 and the static part 101.

In instances in which the movable part 102 is lifted out of contact with the surface 106 by the SMA wires 108, the movable part 102 is held solely by the SMA wires 108 and the spring 110. Stable positioning of the movable part 102 is difficult to achieve. Control of the SMA wires 108 so as to reliably and accurately move the movable part 102 while out of contact with the surface 106 is complex.

Embodiments of the present invention provide improvements to the prior art actuator assembly 100 of FIG. 1.

Overview of the Actuator Assembly

Embodiments of the present invention are described below with reference to the schematic views of FIGS. 2 to 5.

The actuator assembly comprises a support structure 10 and a movable part 20. The movable part 20 is movable relative to the support structure 10. In general, the support structure 10 and the movable part 20 may be referred to as a first part and a second part respectively, and the terms support structure 10 and movable part 20 are used herein for purely illustrative purposes. The support structure 10 may also be referred to as a static part. In this regard, the support structure 10 is used herein as a reference structure. Movement of any components of the actuator assembly 1 is described relative to the support structure 10, unless otherwise indicated. However, in general the support structure 10 may itself be movable, for example within a larger device into which the actuator assembly 1 is incorporated. In some embodiments, the support structure 10 may be made up of components that are movable relative to each other.

The movable part 20 is movable relative to the support structure 10 within a range of movement. The range of movement may define movement in any number of degrees of freedom (DOF). Preferably, the range of movement defines movement in up to three DOFs, for example one or three DOFs. The movable part 20 may be movable relative to the support structure 10 in a movement plane within the range of movement, and/or along a movement axis within the range of movement, for example.

The actuator assembly 1 comprises one or more SMA wires 40. Preferably, the actuator assembly 2 comprises at least two SMA wires 40. The SMA wires 40 are arranged, on contraction, to move the movable part 20 relative to the support structure 10. The SMA wires 40 move the movable part 20 to any position within the range of movement. For example, the SMA wires 40 may move the movable part 20 in one DOF, in two DOFs or in three DOFs. Preferably, the actuator assembly 1 comprises at least two opposed SMA wires 40, wherein one of the two SMA wires 40 is arranged to move the movable part 20 in one direction within the range of movement, and the other of the two SMA wires 40 is arranged to move the movable part 20 in another, opposite, direction within the range of movement.

Each of the SMA wires 40 may be connected at one end to the support structure 10 by a corresponding coupling element (not shown) and at the other end to the movable part 20 by a corresponding coupling element (not shown). The coupling elements may be crimps, for example. The coupling elements may provide both mechanical and electrical connection to the SMA wires 40. In general, any other mechanisms or arrangements for transferring stresses in the SMA wires 40 to the movable part 20 so as to drive movement of the movable part 20 may be used.

The SMA wires 40 may each be electrically connected (via the coupling elements) to a control circuit (not shown) which may be implemented in an integrated circuit (IC) chip, for example. The control circuit in use applies drive signals to the SMA wires 40 which resistively heat the SMA wires 40, causing them to contract. The plural SMA wires 40 may be driven independently or otherwise. The control circuit may also measure the resistance of the SMA wires 40, and use the measured resistance to calculate/determine the position of the movable part 20. In general, however, the SMA wires 40 may be heated so as to contract by any other suitable means, such as via an external heat source, radiative heating or inductive heating.

In this regard, the range of movement comprises any movement of the movable part 20 relative to the support structure 10 that can be achieved by selective contraction of the arrangement of SMA wires 40. The range of movement may be defined as the movement achievable by selective contraction of the SMA wires 40. Optionally, the range of movement may be limited by endstops between support structure 10 and movable part 20, in particular when contraction of the SMA wires 40 causes an endstop between support structure 10 and movable part to engage. The range of movement may also be affected, at least in part, by a bearing arrangement defining the DOFs in which the movable part 20 may be moved.

The range of movement may thus be defined as the collection of locations and orientations to which the movable part 20 may be moved relative to the support structure 10 by the SMA wires 40. The range of movement may be affected by one or more of i) the arrangement of SMA wires 40 as well as control for driving the SMA wires 40, ii) the provision of endstops between movable part 20 and support structure 10 that limit the range of movement, iii) the provision of bearing arrangements that define the DOFs of movement of the movable part 20 relative to the support structure 10. In some embodiments, the range of movement may define movement of the movable part 20 relative to the support structure 10 in a movement plane (in 2 or 3 DOFs) or along a movement path (in 1 DOF).

Friction Surfaces for Zero Hold Power

The support structure 10 comprises a first friction surface 10*f*. The movable part 20 comprises a second friction surface 20*f*. The second friction surface 20*f* of the movable part 20 engages the first friction surface 10*f* of the support structure 10. The first and second friction surfaces 10*f*, 20*f* may engage each other throughout the range of movement. So, in normal use (i.e. under contraction of the SMA wires 40 for moving the movable part 20), the first and second friction surfaces 10*f*, 20*f* may remain in engagement with one another.

The actuator assembly 1 further comprises a biasing arrangement 30. The biasing arrangement 30 is arranged to bias the first and second friction surfaces 10*f*, 20*f* against each other. The biasing arrangement 30 applies a biasing force between support structure 10 and movable part 20. The biasing force comprises a component that is perpendicular to the first and second friction surfaces, and so the biasing arrangement 30 applies a normal force N between support structure 10 and movable part 20. The normal force N is perpendicular to the range of movement and perpendicular to the friction surfaces 10*f*, 20*f*. Preferably, the biasing arrangement 30 applies the biasing force in the direction perpendicular to the range of movement and perpendicular to the friction surfaces 10*f*, 20*f*. The biasing force of the biasing arrangement may be equal to the normal force N. So, the biasing force may not have a component parallel to the range of movement, and thus not affect movement of the movable part 20 relative to the support structure 10.

This normal force N generates or gives rise to a static frictional force F between the first and second friction surfaces 10*f*, 20*f*. The static frictional force F constrains movement of the movable part 20 relative to the support structure 10, in particular when the SMA wires 40 are not contracted. Such movement is constrained at any position and/or orientation within the range of movement of the movable part 20 relative to the support structure 10.

The SMA wires 40 may be used to move the movable part 20 to any position within the range of movement of the movable part 20 relative to the support structure 10. Upon energising (i.e. when drive signals are applied to the SMA wires by the control circuit), the SMA wires 40 contract and apply an actuating force for moving the movable part 20 in respective directions. The actuating force is sufficient to overcome the frictional forces at the friction surfaces 10f, 20f (in particular after reduction or elimination of the frictional forces due to SMA wire contraction), in order to drive relative movement between the movable part 20 and the support structure 10. Upon ceasing power supply to the SMA wires 40, and so when stopping contraction of the SMA wires 40, the movable part 20 remains at its position within the range of movement due to the frictional forces between the first and second friction surfaces 10f, 20f. In this state, the movable part 20 is retained in position with zero power consumption by the actuator assembly 1, so the actuator assembly 1 may be referred to as a zero hold power actuator assembly, as may the other actuator assemblies disclosed herein. The movable part 20 is thus held in place without requiring power supply to the SMA wires 40, reducing the power consumption of the actuator assembly compared to a situation in which the SMA wires 40 need to be powered to hold the movable part 20 in place.

The SMA wires 40 are arranged, on contraction, to reduce the normal force N between first and second friction surfaces 10f, 20f. Put another way, the composite force acting on the movable part 20 due to stresses in the SMA wires 40 has a component that is parallel to and opposite in direction to the normal force N. The stresses in the SMA wires 40 affect (in particular reduce) the normal force N. In some embodiments, equal stresses (or tensions or strains) in the SMA wires 40 may reduce the normal force N without moving the movable part 20. Unequal strains in the SMA wires 40 may result in movement of the movable part 20.

Such an arrangement in which the normal force N is reduced by the SMA wires 40 allows selective reduction in the frictional forces by appropriate contraction of the SMA wires 40. This reduction of the frictional forces assists with the overcoming of the frictional forces to allow movement of the movable part 20 within the range of movement. So, the stress in the SMA wires 40 required to move the movable part 20 may be reduced compared to a situation in which the frictional forces are not reduced. Furthermore, the frictional forces in the absence of contraction of the SMA wires 40 may be designed to be higher compared to a situation in which the frictional forces cannot be reduced, thus reducing the risk of inadvertent movement of the movable part 20 in the absence of SMA wire contraction.

Characteristics of the Frictional Forces

As described above, the normal force N generates or gives rise to a static frictional force F between the first and second friction surfaces 10f, 20f. The static frictional force F constrains movement of the movable part 20 relative to the support structure 20. The magnitude of the static frictional force F is thus large enough to constrain such movement. The magnitude of the static frictional force F is proportional to the normal force N and the coefficient of static friction u, such that $F=\mu*N$. The static frictional force F may be increased by increasing the normal force N, which is achieved by appropriate design of the biasing arrangement 30, and/or by increasing the coefficient of static friction, which is achieved by appropriate design of the friction surfaces 10f, 20f.

The magnitude of the static frictional force is great enough to constrain movement of the movable part, in particular before reduction due to contraction of the SMA wires 40. The ratio of the static frictional force to weight of the movable part may be greater than 1. So, the magnitude of the static frictional force is greater than the weight of the movable part. This ensures that movement of the movable part is constrained by the frictional force even when the actuator assembly 1 is turned on its side, for example. The weight of the movable part is considered to be equal to the mass of the movable part times earth's average gravitational acceleration (9.81 m/s$^2$). Preferably, the ratio of the static frictional force to the weight of the movable part is greater than 3, further preferably greater than 5, further preferably greater than 10. This ensures that movement of the movable part 20 is constrained even when the actuator assembly 1 accelerates. A larger ratio of static frictional force to weight of the movable part reduces the risk of movement of the movable part due to acceleration (e.g. impact events) of the actuator assembly 1. Higher frictional forces may also in some situations compensate for any lateral biasing forces of the biasing arrangement 30, for example when the biasing arrangement is connected between the support structure 10 and the movable part 20 (as in FIG. 4D).

The SMA wires may eb arranged to reduce the normal force upon contraction. In some embodiments, the normal force between first and second friction surfaces is reduced by at least 10%, preferably at least 20%, most preferably by at least 50%. The normal force N may be reduced by at least 90%. In some embodiments, the normal force N is reduced by 100%, i.e. the movable part 20 lifts off the first friction surface 10f.

Similarly, the static frictional force F between first and second friction surfaces may be reduced by at least 10%, preferably at least 20%, most preferably by at least 50%. The static frictional force F may be reduced by at least 90%. In some embodiments, the static frictional force F is reduced by 100%, i.e. the movable part 20 lifts off the first friction surface 10f. The overall frictional force between movable part 20 and support structure 10 may thus be reduced, for example by at least 10%, at least 20%, at least 50%, or at least 90%. Some residual frictional forces may remain in any bearing arrangement (if provided), even upon lift-off of the movable part from the first friction surface 10f.

The magnitude of the static frictional force is low enough to allow the SMA wires 40 to overcome the static frictional force so as to move the movable part 20 relative to the support structure 10, in particular after reduction due to contraction of the SMA wires 40. So, the magnitude of the reduced static frictional force is less than the force applied to the movable part 20 by the SMA wires 40 in the movement direction. The static frictional force may be less than 50%, preferably less than 20%, further preferably less than 10% of the force generated by a stress of 200 MPa in the SMA wires 40 for moving the movable part 20 relative to the support structure 10.

The coefficient of static friction between the first and second friction surfaces 10f, 20f directly affects the magnitude of the static frictional force F. The coefficient of static friction may be modified by appropriately processing or selecting the material of the first and second friction surfaces 10f, 20f. The coefficient of static friction may be in the range between 0.05 and 0.6. Preferably, the coefficient of static friction is in the range between 0.1 and 0.4. In general, lower coefficients of static friction can be compensated for by higher normal forces N imparted by the biasing arrangement 30.

The requirements for the static frictional forces F between first and second friction surfaces 10f, 20f have been described above. These requirements may ensure that the movable part 20 remains in place relative to the support structure 10 once in position. Preferably, the same requirements apply to the dynamic or kinetic frictional forces between first and second friction surfaces 10f, 20f, thus ensuring that the movable part 20 rapidly comes to rest after being moved by the SMA wires 40. For this purpose, the ratio of the dynamic frictional force to weight of the movable part, the relation between dynamic frictional force and forces due to the SMA wires 40, and the coefficient of dynamic friction between the first and second friction surfaces 10f, 20f may be as described in relation to the static frictional force F. Preferably, the static friction coefficient between the first and second friction surfaces 10f, 20f is substantially equal (e.g. varying by less than 5%, preferably less than 1%) to the dynamic friction coefficient between the first and second friction surfaces 10f, 20f. This makes the forces acting on the movable part more predictable, reducing the complexity of movement control.

Biasing Arrangements

FIGS. 2A-D and 3A-C schematically depict embodiments of the actuator assembly 1. Compared to the prior art actuator assembly 100 of FIG. 1, in which the spring 110 is connected between static part 101 and movable part 102, the biasing arrangement 30 of the depicted actuator assemblies 1 is comprised by the movable part 20 in FIGS. 2A-D or by the support structure 10 in FIGS. 3A-C. So, the biasing arrangement 30 moves with the movable part 20 in FIGS. 2A-D or remains static relative to the support structure 10 in FIGS. 3A-C.

As such, the biasing arrangement 30 is arranged to apply the normal force N only in a direction perpendicular to the range of movement at any position within the range of movement. Compared to the spring 110 of the prior art actuator assembly 100 of FIG. 1, no lateral force acting parallel to the range of movement is created by the biasing arrangement 30 of the embodiments of FIGS. 2 and 3 when moved away from an initial, central position. As such, there is no lateral force opposing the frictional forces between the movable part 20 and support structure 10, reducing the risk of inadvertent movement of the movable part 20 in the absence of contraction of the SMA wires 40. Controlled and accurate movement of the movable part 20 relative to the support structure 10 may be made simpler due to the absence of a varying lateral force acting on the movable part 20.

FIGS. 2A-D depict embodiments of the present invention in which the biasing arrangement 30 forms part of the movable part 20. The movable part 20 comprises the biasing arrangement 30. The biasing arrangement 30 moves (in its entirety) with the movable part 20 relative to the support structure. In such an arrangement, it is easier to ensure that the biasing force of the biasing arrangement 30 acts in a direction perpendicular to the range of movement. Although the support structure 10 is depicted in the figures as two parts 10 for ease of illustration, the support structure 10 in practice may be one part, i.e. the two parts 10 depicted in FIGS. 2A-C are connected.

As shown, the movable part 20 comprises two portions 20a, 20b. The biasing arrangement 30 applies a biasing force between the two portions 20a, 20b. The two portions 20a, 20b may be coupled via the biasing arrangement 30. One end of the biasing arrangement 30 may be connected to one of the two portions 20a, 20b, and the other end of the biasing arrangement 30 may be connected to the other of the two portions 20a, 20b.

In the embodiment of FIG. 2A, for example, a bearing arrangement 50 is provided between one of the portions 20b and the support structure 10. The SMA wires 40 are connected between the other of the portions 20a and the support structure 10. The second friction surface 20f is provided on the other of the portions 20a. The SMA wires 40 are angled away from the friction surfaces 10f, 20f, and arranged to move the movable part in opposite directions. So, upon equal contraction of (or equal tension in) the SMA wires 40, the normal force N between first and second friction surfaces 10f, 20f is reduced. A difference in contraction between the SMA wire 40 moves the movable part 20 relative to the support structure 10 on the bearing arrangement 50.

FIG. 2B shows another embodiment of the present invention in which the biasing arrangement 30 is part of the movable part 20. Here, the biasing arrangement 30 is a resilient element, in particular comprising flexures. In the depicted embodiment, one portion 20b of the movable part 20 is a body to which the flexures are connected, and the other portion of the movable part 20 is formed integrally with the flexures. In general, either one or both of the portions of the movable part 20 may be formed integrally with the biasing arrangement 30, be it in the form of a resilient element (such as one or more flexures) or any other form. As described in relation to FIG. 2A, a bearing arrangement 50 is provided between one portion 20b of the movable part 20 and the support structure 10. The SMA wires 40 are connected between the other portion 20a of the movable part 20 and the support structure 10. The second friction surface 20f is formed on the other portion 20a. So, the second friction surface 20f is formed integrally with the biasing arrangement 30 (in the form of the flexures).

FIG. 2C shows another embodiment of the present invention in which the biasing arrangement 30 is part of the movable part 20. The movable part 20 comprises two portions 20a, 20b. One of the SMA wires 40 is connected to one portion 20a, and another of the SMA wires 40 is connected to the other portion 20b. The second friction surface 20f is formed between the support structure 10 and both portions of the movable part 20. Upon equal contraction of (or equal tension in) the SMA wires 40, the normal force N acting between the first and second friction surfaces 10f, 20f is reduced. A difference in contraction between the SMA wire 40 moves the movable part 20 relative to the support structure. In the embodiment of FIG. 2C, the friction surfaces 10f, 20f act as a bearing arrangement 50, in particular a plain bearing, for guiding movement of the movable part 20 relative to the support structure 10.

FIG. 2D shows another embodiment of the present invention in which the biasing arrangement 30 is part of the movable part 20. Compared to the embodiments shown in FIGS. 2A-C, the biasing arrangement 30 is a magnetic biasing arrangement 30. The magnetic biasing arrangement 30 provides a magnetic biasing force for biasing the first friction surface 10f against the second friction surface 20f. The magnetic biasing arrangement comprises a magnet (preferably a permanent magnet) on one portion 20a of the movable part 20, and a magnet (preferably a permanent magnet) or ferromagnetic material on the other portion 20b of the movable part 20. The biasing force of the biasing arrangement 30 corresponds to the magnetic force between the magnetic components. A bearing arrangement 50 is provided between one portion 20b and the support structure 10. The SMA wires 40 are connected between the other portion 20a and the support structure 10, and the second friction surface 20f is provided on the other portion 20a.

FIG. 2D also schematically depicts a bearing arrangement 22 between the two portions 20a, 20b. In FIG. 2D, the bearing arrangement 22 is a plain bearing, although in general the bearing arrangement 22 may comprise any other form of bearing, such as a rolling bearing or flexure bearing. The bearing arrangement 22 may allow movement of the two portions 20a, 20b in a direction perpendicular to any movement direction of the movable part 20 relative to the support structure 10 within the range of movement. So, the bearing arrangement 22 may constrain movement of the two portions 20a, 20b in a direction parallel to any movement direction of the movable part 20 relative to the support structure 10 within the range of movement. Provision of the bearing arrangement 22 may be particularly beneficial in embodiments with magnetic biasing arrangement, due to the relatively low lateral stiffness of the magnetic biasing arrangement 30. In general, however, the bearing arrangement 22 may be provided between any two portions 20a, 20b of the movable part 20 or between any two portions 10a, 10b of the support structure 10.

Figure 3B:
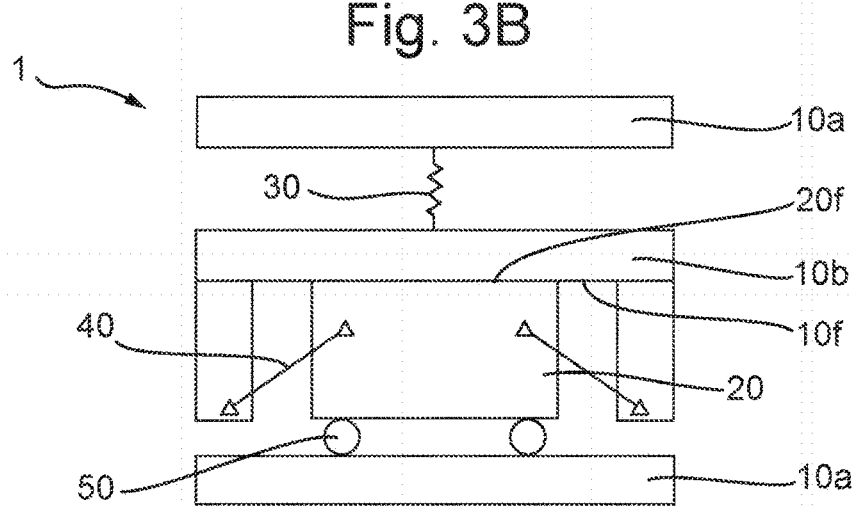
Figure 3C:
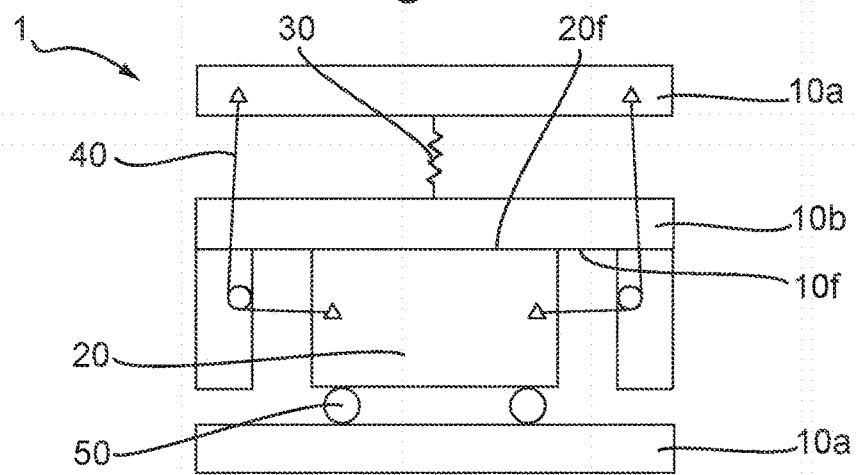

FIGS. 3A-C depict embodiments of the present invention in which the biasing arrangement 30 forms part of the support structure 10. The support structure 10 comprises the biasing arrangement 30. The biasing arrangement 30 (in its entirety) remains static relative to the support structure 10, and the movable part 20 moves relative to the biasing arrangement 30. In such an arrangement, it is easier to ensure that the biasing force of the biasing arrangement 30 acts in a direction perpendicular to the range of movement.

As shown, the support structure 10 comprises two portions 10a, 10b. The biasing arrangement 30 applies a biasing force between the two portions 10a, 10b. The two portions 10a, 10b may be coupled via the biasing arrangement 30. One end of the biasing arrangement 30 may be connected to one of the two portions 10a, 10b, and the other end of the biasing arrangement 30 may be connected to the other of the two portions 10a, 10b.

In the embodiment of FIG. 3A, for example, a bearing arrangement 50 is provided between one of the portions 10b and the movable part 20. The SMA wires 40 are connected between the other of the portions 10a and the movable part 20. The first friction surface 10f is provided on the other of the portions 10a. The SMA wires 40 are angled away from the friction surfaces 10f, 20f, and arranged to move the movable part in opposite directions. So, upon equal contraction of (or equal tension in) the SMA wires 40, the normal force N between first and second friction surfaces 10f, 20f is reduced. A difference in contraction between the SMA wire 40 moves the movable part 20 relative to the support structure on the bearing arrangement 50.

FIG. 3B depicts another embodiment in which the biasing arrangement 30 is provided between two portions 10a, 10b of the support structure 10. A bearing arrangement 50 is provided between one of the portions 10a and the movable part 20. The SMA wires 40 are connected between the other of the portions 10b and the movable part 20. The first friction surface 10f is provided on the other of the portions 10b. The SMA wires 40 are angled away from the friction surfaces 10f, 20f, and arranged to move the movable part in opposite directions. So, upon equal contraction of (or equal tension in) the SMA wires 40, the normal force N between first and second friction surfaces 10f, 20f is reduced. A difference in contraction between the SMA wire 40 moves the movable part 20 relative to the support structure on the bearing arrangement 50.

FIG. 3C depicts another embodiment in which the biasing arrangement 30 is provided between two portions 10a, 10b of the support structure 10. The embodiment of FIG. 3C is similar to the embodiment of FIG. 3B, except for the arrangement of the SMA wires 40. In particular, in FIG. 3C, the SMA wires 40 are not angled relative to the friction surfaces 10f, 20f. The SMA wires 40 are connected between one of the portions 10a of the support structure 10 and the movable part 20. The SMA wires 40 further bend around portion of the other portion 10b of the support structure 10. So, the SMA wires 40 comprise a first length of SMA wire extending between the portions of the support structure 10, and a second length of SMA wire extending between the other portion 10b of the support structure 10 and the movable part 20. Upon equal contraction of (or equal tension in) the SMA wires 40, the normal force N between first and second friction surfaces 10f, 20f is reduced. A difference in contraction between the SMA wire 40 moves the movable part 20 relative to the support structure on the bearing arrangement 50.

As shown in the embodiments of FIGS. 2B-D, the support structure 10 may comprise multiple separated first friction surfaces 10f and/or the movable part 20 may comprise multiple separated second friction surfaces 20f. The normal forces N acting between each of these friction surfaces may be reduced upon contraction of the SMA wires 40, or the overall normal force N may be reduced so as to reduce the overall frictional forces. In general, multiple separated first and/or second friction surfaces 10f, 20f may be provided in any embodiment of the present invention, e.g. also in the embodiments of FIG. 2A or 3A-C. The multiple separated friction surfaces may be provided in different planes (as in FIG. 2C), for example, or may be provided in the same plane (as in FIGS. 2B and 2D). The support structure and/or the movable part may optionally comprise one or more protrusions on which the first and/or second friction surface 10f, 20f is formed, which allows the area of contact between first and second friction surfaces 10f, 20f to be defined.

In general, even though the biasing arrangement 30 is schematically depicted as a spring element in FIGS. 2A-C and 3A-C, the biasing arrangement 30 may comprise any component capable of applying a biasing force between movable part 20 and support structure 10. The biasing arrangement 30 may, for example, comprise a resilient element such as a flexure, a coil spring, a leaf spring, an elastomer, or any other suitable biasing element such a pair of a magnet and a ferromagnetic element (as shown in FIG. 2D).

In arrangements in which the biasing arrangement 30 comprises a resilient element, the resilient element (e.g. the flexure) is preferably compliant (or only compliant) in at least a direction orthogonal to the friction surfaces 10f, 20f. In general, the resilient element (e.g. the flexure) may also be compliant in other directions other than the one normal to the surface, particularly in embodiments in which the biasing arrangement is connected between movable part 20 and support structure 10. In embodiments in which the movable part 20 or support structure 10 comprise plural portions 10a,b, 20a,b, movement of the portions 10a,b, 20a,b relative to each other in a direction parallel to the range of movement may be constrained. For example, with reference to FIGS. 2A-C, the biasing arrangement 30 may be relatively stiff in a direction parallel to the range of movement. An additional bearing arrangement 22 as described in relation to FIG. 2D, may optionally be provided to constrain relative movement of the two portions 10a,b, 20a,b. An endstop 70 (as described in relation to FIGS. 4A-D) may also constrain such relative movement. Generally, relative movement of the two portions of the movable part 20 or support structure 10 in a direction along a movement direction or in a movement plane within the range of movement may be constrained.

Even though the biasing arrangement 30 is schematically depicted as being arranged between the support structure 10 and the movable part 20 in a direction along the normal force N, in practice the biasing arrangement 30 may be arranged in a lateral direction, i.e. in a direction from a side of the movable part 20 and to a side of the support structure 10. A flexure or leaf spring may, for example, generally extend in a direction parallel to the frictional force F while applying a normal force N to the movable part 20. This may provide a more compact actuator assembly.

In some embodiments, the biasing arrangement 30 may be arranged to also provide a biasing force to the bearing arrangement 50. So, the biasing arrangement 30 may be arranged to load the bearing arrangement 50. The biasing arrangement 30 may keep the bearing arrangement 50 in engagement. This is particularly advantageous when the bearing arrangement 50 comprises a rolling bearing or a plain bearing.

Furthermore, even though the biasing arrangement 30 is depicted to push the portions of the movable part 20 or support structure 10 apart in FIGS. 2A-C and 3A-C (e.g. due compression in a resilient element), the biasing arrangement 30 may instead be arranged pull these portions together (e.g. due to tension in a resilient element). Similarly, even though the magnetic biasing arrangement 30 is depicted to pull the portions of the movable part 20 or support structure 10 together in FIG. 2D (e.g. due attractive magnetic forces), the magnetic biasing arrangement 30 may instead be arranged pull these portions together.

The biasing arrangement 30 may comprise plural biasing elements that work in concert to provide the biasing force. So, the biasing arrangement 30 may comprise any combination of the biasing arrangements described above.

Bearing Arrangements

In FIGS. 2A, B, D and 3A-C, a dedicated bearing arrangement 50 is provided between the support structure 10 and the movable part 20, in particular between the support structure 10 and a portion of the movable part 20.

The bearing arrangement 50 may be provided independently from the friction surfaces 10f, 20f. This may make controlled movement of the movable part 20 relative to the support structure 10 by the SMA wires 40 simpler.

Except where the context requires otherwise, the bearing arrangement 50 is used herein as follows. The bearing arrangement 50 is used herein to encompass the terms "sliding bearing" or "plain bearing", "rolling bearing" (including "ball bearing" or "roller bearing") and "flexure bearing". The term "bearing" is used herein to generally mean any element or combination of elements that functions to constrain motion to only the desired motion. The term "sliding bearing" is used to mean a bearing in which a bearing element slides on a bearing surface, and includes a "plain bearing". The term "rolling bearing" is used to mean a bearing in which a rolling bearing element, for example a ball or roller, rolls on a bearing surface. In embodiments, the bearing may be provided on, or may comprise, non-linear bearing surfaces. In some embodiments, more than one type of bearing arrangement may be used in combination to provide the bearing functionality. Accordingly, the term "bearing" used herein includes any combination of, for example, plain bearings, rolling bearings and flexure bearings.

In the depicted embodiments, for example, the bearing arrangement 50 comprises a rolling bearing. A rolling bearing is a roller bearing or a ball bearing, for example. The rolling bearing comprising a support bearing surface on the support structure 10, a movable bearing surface on the movable part 20 and a rolling bearing element (such as a roller or ball) arranged between the support bearing surface and the movable bearing surface. In some embodiments, for example in embodiments in which the range of movement is defined in a movement plane, the support bearing surface and movable bearing surface are parallel to the first and second friction surfaces 10f, 20f.

In alternative embodiments, the bearing arrangement 50 comprises a plain bearing or sliding bearing. So, the bearing arrangement 50 in any of the embodiments described herein may be a plain bearing. The plain bearing is formed between an engaging surface on the support structure that is in engagement with a corresponding engaging surface on the movable part 20. The plain bearing may be considered to be separate from the friction surfaces 10f, 20f for example in instances in which the friction coefficients in the plain bearing are lower, e.g. significantly lower (e.g. less than 50%, or less than 90%), than the friction coefficients between the first and second friction surfaces 10f, 20f. For this purpose, the plain bearing may comprise a friction reducing coating or material on the support structure 10 and/or movable part 20, or a friction reducing lubricant between the engaging surfaces. Such plain bearings may, for example, comprising a polymer or a polymer coating. The coefficient of static friction between the engaging surfaces of the plain bearing may be less than 5 times, preferably less than 10 times, of the coefficient of static friction between the first and second friction surfaces 10f, 20f.

Alternatively, the bearing arrangement 50 in any one of the embodiments may comprise a flexure bearing (not shown). The flexure bearing comprises one or more flexures, the flexures resisting deformation along their longitudinal extent and being relatively deformable lateral to their longitudinal extent. The flexures of the bearing arrangement 50 may be held in tension, at least partly due to the biasing force of the biasing arrangement 30. The flexures allow movement of the movable part 20 within the range of movement, but constrain movement outside the range of movement.

In general, the actuator assembly 1 comprises a bearing arrangement 50 for bearing movement of the movable part 20 relative to the support structure 10. The bearing arrangement 50 may be separate from the first and second friction surfaces 10f, 20f (as in FIGS. 2A, B, D, 3A-C). Alternatively, the bearing arrangement 50 may, at least in part, be formed from the first and second friction surfaces 10f, 20f (as in FIG. 2C).

The bearing arrangement 50 constrains movement of the movable part 20 to movement within the range of movement. The bearing arrangement 50 may constrain movement of the movable part 20 relative to the support structure 10 to movement in three degrees of freedom. For example, the bearing arrangement 50 may constrain movement of the movable part relative to the support structure to movement in a movement plane. The movement may comprise three DOFs, for example i) translation in a first direction in the movement plane, ii) translation in a second direction in the movement plane, perpendicular to the first direction, and iii) rotation in the movement plane. Alternatively, the movement may comprise two DOFs, for example i) translation in a first direction in the movement plane, ii) translation in a second direction in the movement plane, perpendicular to the first direction. This may allow the actuator assembly to be used in applications requiring such 3 DOF or 2 DOF movement, for example as an optical image stabilization (OIS) actuator assembly implementing sensor shift OIS or lens shift OIS.

In other embodiments, the bearing arrangement 50 may constrain movement of the movable part 20 relative to the support structure 10 to movement in one degree of freedom. This may allow the actuator assembly to be used in applications requiring such 1 DOF movement, for example as an autofocus (AF) actuator assembly. An actuator assembly with 1 DOF of movement may be simpler to manufacture and control compared to an actuator assembly with more DOFs. For example, the bearing arrangement 50 may constrain movement of the movable part relative to the support structure to helical movement about a helical axis. Alternatively, the bearing arrangement may constrain movement of the movable part 20 relative to the support structure 10 to translational movement along a movement axis. Further alternatively, the bearing arrangement 50 may constrain movement of the movable part 20 relative to the support structure 10 to rotational movement about a rotation axis.

As such, there may be provided actuator assembly comprising a support structure comprising a first friction surface; a movable part comprising a second friction surface engaging the first friction surface; a helical bearing arrangement supporting the movable element on the support structure and arranged to guide helical movement of the movable element with respect to the support structure around a helical axis, wherein the helical bearing arrangement is formed by the first and second friction surfaces; and one or more SMA wires arranged, on contraction, to drive rotation of the movable element around the helical axis which the helical bearing arrangement converts into said helical movement; and biasing arrangement configured to load the helical bearing arrangement, thereby biasing the first and second friction surfaces against each other with a normal force and generating a static frictional force that constrains the movement of the movable part relative to the support structure at any position within the range of movement when the one or more SMA wires are not contracted, wherein the one or more SMA wires are arranged, on contraction, to reduce the normal force between first and second friction surfaces.

The first and second friction surfaces 10*f*, 20*f* may be arranged to allow movement of the movable part 20 relative to the support structure 10 in the DOFs allowed by the bearing arrangement 50. For example, one or both of the first and second friction surfaces 10*f*, 20*f* is or are planar. This may allow movement in up to 3 DOFs. In embodiments in which movement in one DOF is allowed, one of the first and second friction surfaces 10*f*, 20*f* may be provided on a protrusion and the other of the first and second friction surfaces 10*f*, 20*f* may be provided on a guide channel shaped complementary to the protrusion. The range of movement of the movable part 20 relative to the support structure 10 may thus comprise movement along a line parallel to the guide channel.

Endstops

As described above, the SMA wires 40 may reduce the normal force N between first and second friction surfaces 10*f*, 20*f*. The first and second friction surfaces 10*f*, 20*f* may remain in contact upon contraction of the SMA wires 40. Alternatively, in any of the embodiments described herein, the one or more SMA wires 40 may, on contraction, lift the first and second friction surfaces 10*f*, 20*f* out of engagement. So, the first and second friction surfaces 10*f*, 20*f* may separate upon contraction of the SMA wires 40. The movable part 20 is not in direct contact with the first friction surface 10*f* after contraction of the SMA wires 40.

Preferably, after separating the first and second friction surfaces 10*f*, 20*f*, the movable part 20 bears on the bearing arrangement 50, preferably only on the bearing arrangement 50. The bearing arrangement 50 thus continues to guide movement of the movable part 20 relative to the support structure 10. This makes controlled movement of the movable part 20, after having been lifted out of contact with the first friction surface 10*f*, simpler compared to a situation in which no dedicated bearing arrangement 50 is provided. An actuator assembly 1 in which the SMA wires 40 lift the first and second friction surfaces out of engagement may also be referred to as a discrete friction actuator assembly 1, because the frictional forces between movable part 20 and support structure 10 may in use vary between two discrete values: Relatively high frictional forces before contraction of the SMA wires 40 to keep the movable part 20 in position relative to the support structure 10, and relatively low (e.g. residual) frictional forces due to the bearing arrangement 50 after contraction of the SMA wires 40.

Preferably, in embodiments in which the first and second friction surfaces 10*f*, 20*f* are lifted out of engagement, an endstop 70 is provided. Upon contraction of the SMA wires 40, the endstop 70 engages. The endstop 70, upon engagement, constrains movement of the movable part 20 in a direction perpendicular to the range of movement. The SMA wires 40 may thus drive movement of the movable part 20 more reliably and effectively. Once the endstop 70 is engaged, any strain in the SMA wires 40 may contribute to movement of the movable part 20.

The endstop 70 may be implemented in any of the embodiments described herein. The endstop may be formed, for example, between the two portions 20*a*, 20*b* of the movable part 20 or the two portions 10*a*, 10*b* of the support structure 10. The endstop, upon engagement, may constrain relative movement of the two portions 10*a*, 10*b*. The endstop, upon engagement, may constrain relative movement of the two portions 10*a*, 10*b* in a direction perpendicular to any movement direction of the movable part 20 relative to the support structure 10.

In some embodiments, the endstop, upon engagement, may further constrain relative movement of the two portions 10*a*, 10*b* in a direction parallel to any movement direction of the movable part 20 relative to the support structure 10. Such movement may be constrained, for example, due to frictional forces between the endstop surfaces. Constraining such movement using the endstop may avoid the need for providing any other arrangements (such as a resilient element with relatively high stiffness in the movement direction, or an additional bearing arrangement 22 between the portions as in FIG. 2D) for constraining such relative movement. The endstop surfaces may optionally be provided with complementary teeth (not shown) to constrain sliding between the endstop surfaces in a direction parallel to any movement direction of the movable part 20 relative to the support structure 10.

FIGS. 4A-D schematically depict various embodiments in which an endstop 70 is provided.

Figure 4A:
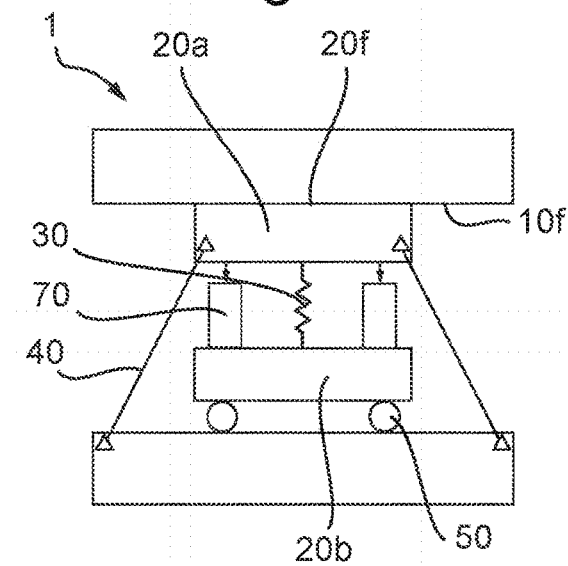
FIGS. 4A-D are schematic side views of actuator assemblies according to embodiments of the present invention, in which an endstop is provided.

FIG. 4A depicts in essence the actuator assembly 1 already described with reference to FIG. 2A, with the addition of an endstop 70. The endstop 70 is formed by an endstop surface on one portion 20*a* of the movable part 20 and an endstop surface on the other portion 20*b* of the movable part 20. Upon contraction of the SMA wires 40, the one portion 20*a* of the movable part may move out of engagement with the first friction surface 10*f* and into engagement with the endstop 70, as illustrated by the arrows in FIG. 4A. In FIG. 4A, the endstop 70 is depicted as being provided by a protrusion on the other portion 20*b*. Additionally or alternatively, a protrusion may be provided on the one portion 20*a*. In general, a protrusion need not be provided, and the endstop 70 may be formed between any corresponding surfaces on the first and second portions 20a, 20b of the movable part 20.

Figure 4B:
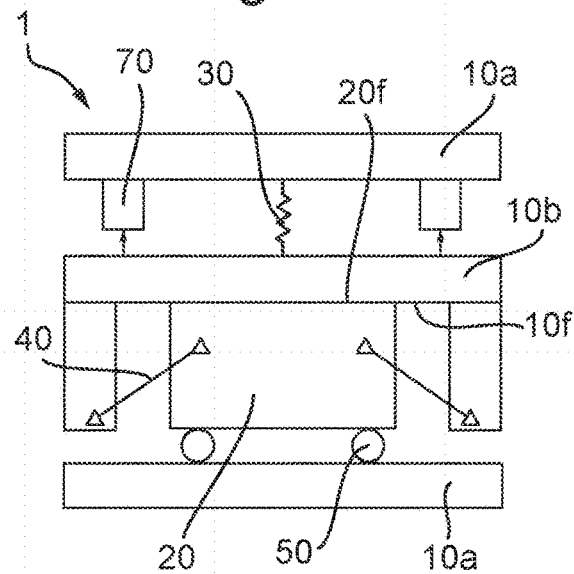

FIG. 4B depicts in essence the actuator assembly 1 already described with reference to FIG. 3B, with the addition of an endstop 70. The endstop 70 is formed by an endstop surface on one portion 10a of the support structure 10 and an endstop surface on the other portion 10b of the support structure 10. Upon contraction of the SMA wires 40, the other portion 20b of the support structure 10 may move out of engagement with the movable part 20, and the other portion 10b of the support structure 10 may move into engagement with the endstop 70, as illustrated by the arrows in FIG. 4B. In FIG. 4B, the endstop 70 is depicted as being provided by a protrusion on the one portion 10a. Additionally or alternatively, a protrusion may be provided on the other portion 10b. In general, a protrusion need not be provided, and the endstop 70 may be formed between any corresponding surfaces on the portions 10a, 10b.

Figure 4C:
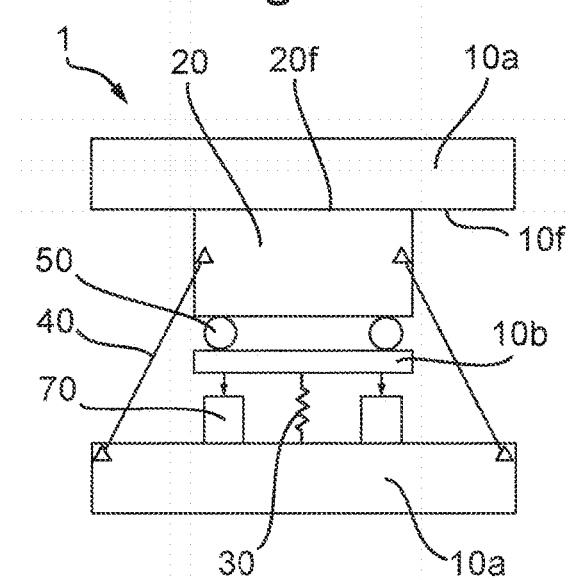

FIG. 4C depicts in essence the actuator assembly 1 already described with reference to FIG. 3A, with the addition of an endstop 70. The endstop 70 is formed by an endstop surface on one portion 10a of the support structure 10 and an endstop surface on the other portion 10b of the support structure 10. Upon contraction of the SMA wires 40, the movable part 20 may move out of engagement with the one portion 10a of the support structure 10, and the other portion 10b of the support structure 10 may move into engagement with the endstop 70, as illustrated by the arrows in FIG. 4C. In FIG. 4C, the endstop 70 is depicted as being provided by a protrusion on the one portion 10a. Additionally or alternatively, a protrusion may be provided on the other portion 10b. In general, a protrusion need not be provided, and the endstop 70 may be formed between any corresponding surfaces on the portions 10a, 10b.

Figure 4D:
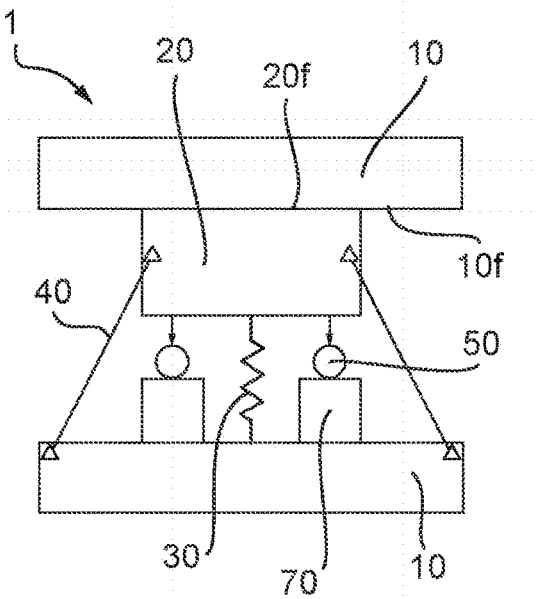

FIG. 4D depicts another embodiment of the present invention. Here, the biasing arrangement 30 is arranged, e.g. connected, between the movable part 20 and the support structure 10. So, one end of the biasing arrangement 30 is connected to the movable part 20 and the other end of the biasing arrangement 30 is connected to the support structure 10. When using a magnetic biasing arrangement 30, one component of the magnetic biasing arrangement 30 is provided on the support structure 10 and the other component is provided on the movable part 20.

In the embodiment of FIG. 4D, the endstop 70 is formed between the movable part and the bearing arrangement 50. In particular, upon contraction of the SMA wires 40, the movable part 20 may move out of engagement with the first friction surface 10f, so out of engagement with the support structure 10. The movable part 20 may move into engagement with the endstop 70, as illustrated by the arrows in FIG. 4D, in particular by moving into engagement with the bearing arrangement 50. The movable part 20 is thus lifted off the first friction surface 10f and onto the bearing elements of the bearing arrangement 50. In general, the SMA wires 40 may be arranged, on contraction, to lift the movable part 20 out of engagement with the first friction surface 10f and into engagement with the bearing arrangement 50 (which may comprise a rolling bearing, plain bearing or flexure bearing, for example). Upon ceasing power to the SMA wires 40, the biasing arrangement 30 may bias the movable part 20 out of engagement with the bearing arrangement 50 and into engagement with the first friction surface 10f.

SMA Wire Arrangements

In FIGS. 2A-C, 3A-C and 4A-D, the SMA wires 40 are arranged angled away from the friction surfaces 10f, 20f. This is one way to ensure that strains and/or stresses in the SMA wires 40 may reduce the normal force N while driving movement of the movable part 20 within the range of movement. Such an arrangement of SMA wires 40 provides a relatively simple manner of reducing the normal force N.

In general, the one or more SMA wires 40 may be arranged, on contraction, to apply actuating forces to the movable part 20 relative to the support structure 10 that are angled relative to (e.g. away from) the first and second friction surfaces 10f, 20f. The actuating forces are not necessarily be parallel to the SMA wires 40. In some embodiments (such as the embodiment of FIG. 3C), the actuating forces to the movable part 20 may even be parallel to the friction surfaces 10f, 20f.

For example, each of the SMA wires 40 may be a V-shaped wire. The V-shaped wire may be connected at both ends to the support structure 10 or movable part 20, and may bend around a contact portion with the movable part 20 or support structure 10. So, the SMA wire 40 need not be connected directly between movable part 20 and support structure 10.

Optionally, a force-modifying mechanism (not shown) may be arranged between SMA wire 40 and movable part 20 or between SMA wire 40 and support structure 10. The force-modifying mechanism may redirect the stress in an SMA wire 40 to act on the movable part in a direction along the actuating force. As such, the stresses and/or strains in the SMA wires 40 may reduce the normal force N, even if the SMA wires 40 are arranged parallel to the friction surfaces 10f, 20f. Such a force-modifying mechanism may also implement stroke or force amplification.

FIG. 3C depicts a particular arrangement of SMA wires 40 in which the SMA wires 40 are connected at one end to one portion 10a of the support structure 10 and at the other end to the movable part 20. The SMA wires 40 bend around the other portion 10b of the support structure. The SMA wires 40 may thus apply actuating forces to the movable part 20 that are substantially parallel to the friction surfaces 10f, 20f.

In general, the SMA wires 40 are arranged on contraction, to reduce the normal force between first and second friction surfaces 10f, 20f. The SMA wires 40 may reduce the normal force due to equal stress and/or strain in the SMA wires 40. The SMA wires 40 further are arranged to move the movable part 20 relative to the support structure 10. The SMA wires 40 may move the movable part 20 due to unequal stress and/or strain in the SMA wires 40.

Furthermore, the SMA wires 40 may be arranged, on contraction, to provide a biasing force to the bearing arrangement 50. The SMA wires 40 may thus help keeping the bearing arrangement 50 in engagement.

Further Embodiments of the Actuator Assembly

FIGS. 5A-D depict further embodiments of the actuator assembly 1, in which the biasing arrangement 30 is comprised by the movable part 20. The actuator assembly 1 of FIGS. 5A-D is functionally similar to the actuator assembly 1 described in relation to FIGS. 2A and 2B.

Figure 5A:
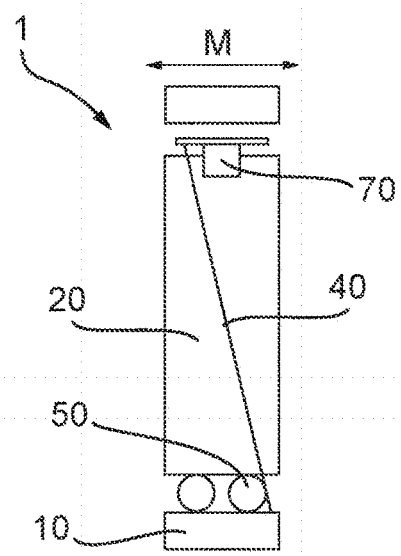
FIGS. 5A-D are schematic side views of further embodiments of the actuator assembly.
Figure 5B:
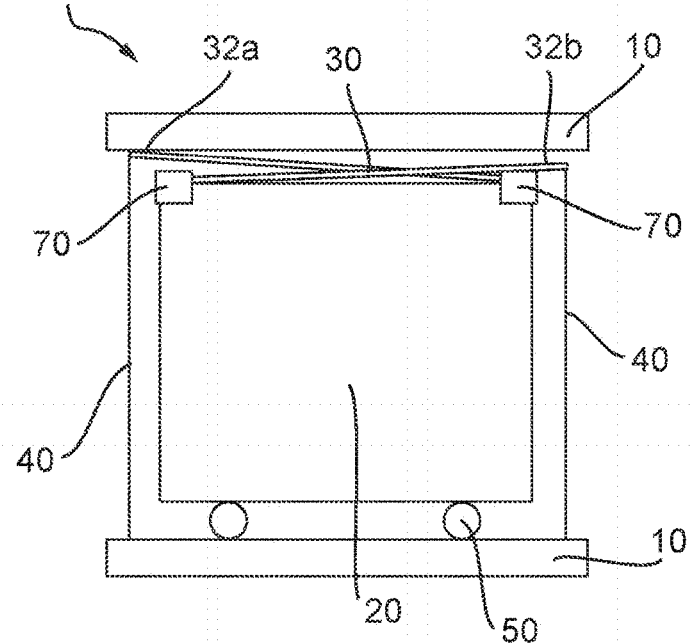

FIG. 5A is one side view of the actuator assembly 1, and FIG. 5B is another side view of the actuator assembly 1. The movable part 20 moves in the left-right direction (movement direction M) in FIG. 5A and into and out of the page in FIG. 5B.

As shown in FIG. 5A, the actuator assembly 1 comprises a flexure 30 having a first end fixedly attached to the movable part 20, and a free end forming a contact portion 32 for engaging with the support structure 10 and generating frictional forces thereat. The contact portion 32 may be considered a second portion of the movable part 20, with the flexure 30 acting as a biasing arrangement 30 between the two portions of the movable part 20. FIG. 5B shows one of the contact portions 32a fully engaged with the first friction surface 10f of the support structure 10, while the other contact portion of the other flexure is disengaged from the surface.

The actuator assembly further comprises SMA wires 40 that are angled to the direction of movement M, as well as a direction normal to the surface of the support structure 10, and along the biasing force from a flexure. The SMA wires 40 are attached to the support structure and the end of the flexure 30 having the contact portion. On contraction, the SMA wires 40 apply an actuating force upon the flexure 30 where a second force component, normal to the surface of the support structure 1a, retracts the contact portion from the surface, reducing the frictional forces thereat. The SMA wires 40, also apply a first force component, along the direction of movement, to drive movement in the moveable part 20. Further contraction in the SMA wires 40 not only drives continuous movement in the movable part 20, but also disengages the contact portion 32 from the first friction surface 10f, eliminating frictional forces caused by the flexure 30. For example, contact portion 32b is shown fully disengaged from the surface of the support structure 10 due to contraction in the corresponding SMA wire 40b.

Upon seizing energy supply to the SMA wires 40, e.g., upon withdrawal of the actuating forces, the flexure 30 reengages with the surface of the support structure 10 and applies a biasing force thereon for constraining free movement in the moveable part 20.

The moveable part 20 also comprises an endstop 70. The endstop defines a limit of movement of the contact portion 32 in a direction perpendicular to the friction surfaces 10f, 20f. As shown in FIG. 5B, when the SMA wire 40a is not energised, the contact portion 32a of the flexure 30 engages with the surface of the support structure 10, and the free end of the flexure 30 is spaced from the endstop 70. When the SMA wire 40b is energised, its actuating force causes the contact portion 32b to recede until the free end of the flexure 30 abuts the endstop. Further contraction of the SMA wire 40b does not cause further retraction in the contact portion 32b. Instead, the actuating force applies solely for driving the movement in the moveable part 20, thus allowing a more precise position control in the moveable part 20.

Upon engaging the flexure 30 with the endstop 70, the second actuating force from the SMA wire 40b applies a torque on the movable part 20. Such resultant torque is countered by the other flexure 30 to prevent tilting in the movable part 20. More specifically, the surface of the support structure 10 reacts to the torque by contact portion 32a.

Preferably, the endstop 70 is arranged to protrude from the surface of the moveable part at a height which, upon making contact with the free end of the flexure 30, leaves a minimal clearance between the contact portion 32 and the surface of the support structure 10.

Figure 5C:
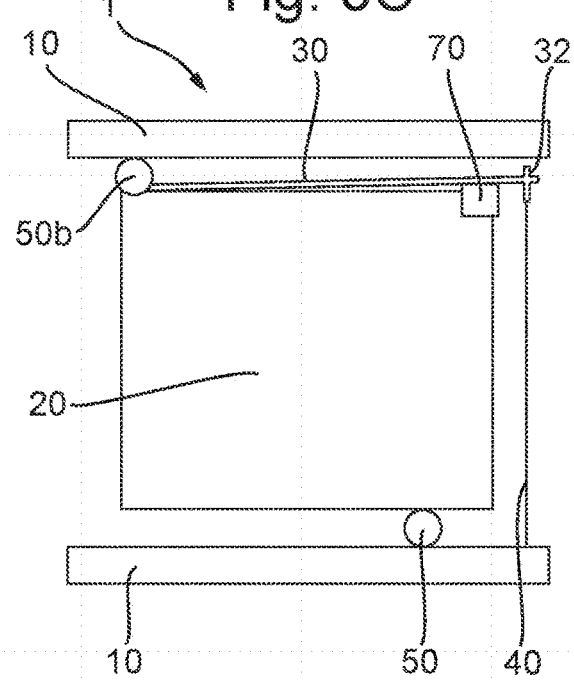

FIG. 5C is a side sectional view of another embodiment of an actuator assembly 1. The actuator assembly 1 has a flexure 30 and an SMA wire 40 arranged in a manner similar to the embodiment of FIGS. 5A and 5B. Only a single SMA 40 is illustrated, although plural SMA wires may be present. Like features are not described again.

In this embodiment, the flexure 30 comprises an upwardly extending lip towards its free end, which forms the contact portion 32 for engaging the surface of the support structure 10. Similarly to the embodiment of FIG. 5B, the moveable part 20 comprises an endstop 70 for limiting the displacement of the contact portion 32 during SMA wire contraction. Advantageously, the use of an upwardly extending lip reduces the extent of bending in the flexure 30 during wire contraction, thus allowing the contact portion 32 to be retracted in a more effective and precise manner.

In the absence of a second flexure, the actuator assembly 6 further comprises a second bearing 50b for countering the torque induced by the second actuating force component, e.g. the force component acting in a direction normal to the surface of the support structure 10. The second bearing 50b is shown as a ball bearing but can be other suitable bearings such as a plain bearing. The second bearing 50b prevents tilting in the moveable part 20, but allows relative movement between the support structure 10 and the moveable part 20.

Figure 5D:
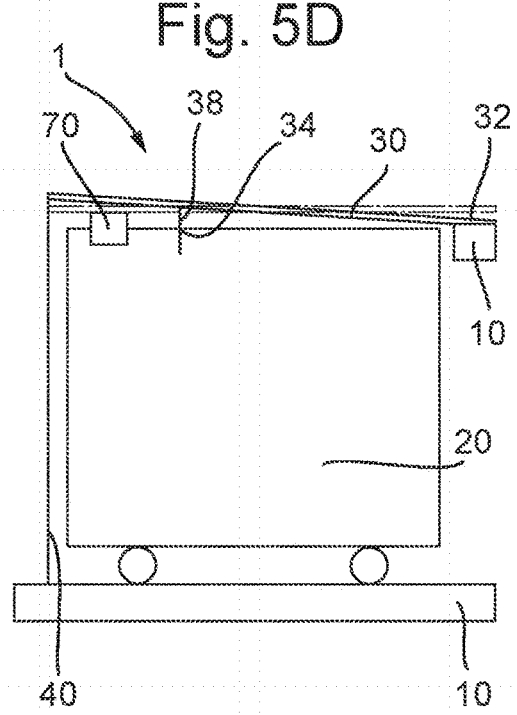

FIG. 5D is a side sectional view of another embodiment of the actuator assembly 1. Features already described with reference to FIGS. 5A and 5B are not described again.

As shown in FIG. 5D, the actuator assembly 1 comprises a flexure 30 fixedly attached to the movable part 20 at anchoring point 34 by a flexure arm 38. The flexure arm 38 extends from a position along the length of the flexure 30, which is spaced from the free ends of the flexure 30. As such, the flexure 30, as well as the two free ends of the flexure 30, are pivotable about the anchoring point.

One of the free ends forms a contact portion 32 for engaging with the support structure 10 and generating frictional forces thereat. That is, as illustrated in FIG. 5D, the contact portion 32 is shown fully engaged with the surface of the support structure 10.

The actuator assembly 1 further comprises an SMA wire 40 that is angled to the direction of movement (e.g. into the page in FIG. 5D), as well as a direction normal to the surface of the support structure 10, e.g. the biasing force from a flexure. The SMA wire 40 is attached between the support structure and the other free end of the flexure 30. Thus, the flexure acts as a class 1 lever.

On contraction, the SMA wire 40 applies an actuating force upon the flexure 30 where the second force component draws downwardly on the end of the flexure 30 that is attached to the SMA wire 40, causing the flexure arm 38 to rotate about the anchoring point 34. As such, by the lever, the free end of the flexure moves upwardly and thereby retracts the contact portion 32 from the surface, thus reducing the frictional forces thereat. The SMA wire 40 also applies the first force component, along the direction of movement, to drive movement in the moveable part 20. Further contraction in the SMA wire 40 not only drives continuous movement in the movable part 20, but also disengages the contact portion 32 from the surface of the support structure 10, eliminating frictional forces caused by the flexure 30. For example, contact portion 32 is shown (along a dotted line) fully disengaged from the surface of the support structure 10 due to contraction in the SMA wire 40.

As described in relation to the embodiment shown in FIGS. 5A and 5B, the moveable part 20 also comprises an endstop 70 which defines a limit of movement of the contact portion 32. Once the SMA wire 40 is energised, its actuating force causes the contact portion 32 to recede until the free end of the flexure 30 abuts the endstop 70. Further contraction in the SMA wire 40 does not cause further retraction in the contact portion 32. Instead, the actuating force is solely applied for driving the movement in the moveable part 20, thus allowing a more precise position control in the moveable part 20.

In the illustrated embodiment of FIG. 5D, where force is applied at a distance closer to the fulcrum (e.g. anchoring point 34) than the load, the contacting point 32 is arranged to displace by a greater amount than a given contraction in the SMA wire 40. Advantageously, such an arrangement allows the contacting point 32 to be promptly retracted. Alternatively, the force may be applied at the same distance as, or at a distance further to the fulcrum, than the load, so as to overcome the biasing force by a stiffer biasing element. More specifically, the flexure 30 is a force-modifying mechanism where the ratio of the input force to the output force can be suitable tailored to different applications.

Applications of Actuator Assembly

The actuator assembly 1 may generally be applied in any application in which it is desired to move a movable part 20 within a range of movement using SMA wires 40, and to keep the movable part 20 in place at any position within the range of movement upon ceasing power supply to the SMA wires 20. The following description provides specific application examples of the present invention, but it will be appreciated that the actuator assembly 1 need not be used in these particular applications.

In some embodiments, the actuator assembly 1 may be a micro-actuator for a camera or a mobile phone. The actuator assembly may, for example, be configured to provide optical image stabilization (OIS) or auto-focus (AF) in a camera apparatus. For these purposes, the actuator assembly may implement 3 DOF or 2 DOF movement (for OIS) or 1 DOF movement (for AF), as described above in relation to the bearing arrangement 50.

There is thus provided a camera apparatus comprising the actuator assembly 1, an image sensor and a lens assembly comprising at least one element. One of an image sensor and the at least one lens element may be fixed relative to the movable part 20 and/or one (e.g. the other) of the image sensor and the at least one lens element may be fixed relative to the support structure 10. Moving the movable part 20 relative to the support structure 10, upon contraction of the SMA wires 40, may effect relative movement between lens element and image sensor. Moving the lens element relative to the image sensor along an optical axis of the lens assembly may effect AF in the camera apparatus. Moving the lens element relative to the image sensor in directions perpendicular to the optical axis and/or rotating the image sensor may effect OIS in the camera apparatus.

Actuator assemblies 1 that may effect OIS are described in WO 2013 175197 A1 or WO 2017 072525 A1, which are herein incorporated by reference. The present invention may be applied to these actuator assemblies 1. Embodiments of such actuator assemblies 1 are shown in FIGS. 11 and 12, for example. In this regard, the movable part 20 may be movable in a movement plane within the range of movement. The actuator assembly 1 may comprise a total of four SMA wires 40 connected between the movable part 20 and the support structure 10 in an arrangement wherein none of the SMA wires 40 are collinear, and wherein the SMA wires 40 are capable of being selectively driven to move the movable part 10 relative to the support structure to any position in said range of movement without applying any net torque to the movable part 20 around a primary axis perpendicular to the movement plane.

For example, two of the SMA wires 40 may be connected between the movable part 20 and the support structure 10 to each apply a torque to the movable part 20 in said movement plane around the primary axis in a first sense around the primary axis and the other two SMA wires 40 are connected between the movable part 20 and the support structure 10 to each apply a torque to the movable part in said movement plane around the primary axis in a second, opposite sense around the primary axis. The four SMA wires 40 may be arranged in a loop at different angular positions around the primary axis, successive SMA wires around the primary axis being connected to apply a force to the movable element in alternate senses around the primary axis.

Alternatively, the movable part 10 may comprise a camera module with both lens assembly and image sensor. Tilting the camera module, upon contraction of the SMA wires, is another way to achieve OIS.

FIGS. 6-11 describe in further detail specific embodiments of the actuator assembly 1, where the actuator assembly effects movement of the movable part 20 along a movement axis. These specific embodiments may be used to effect AF or OIS in a camera apparatus, for example.

FIGS. 6A, 6B and 6C are respectively a plan view and side sectional views of an actuator assembly 1 according to an embodiment of the present invention.

The actuator assembly 1 comprises a support structure 10 that has an image sensor (not shown) mounted thereon. The support structure 10 acts as a mounting platform for various elements as described below and also defines any reference features that are needed during the assembly process.

The actuator assembly 1 further comprises a lens element that is part of the movable part in this example. The lens element comprises a lens carriage 20 which holds a lens (not shown), although alternatively, plural lenses may be present. The lens may be made of glass or plastic. The lens element has an optical axis O aligned with the image sensor and is arranged to focus an image on the image sensor.

Alternatively, although not shown, the image sensor may be part of the movable part, and the lens element may be fixed relative to the support structure.

Although the actuator assembly 1 in this example is a camera apparatus, that is not in general essential. In some examples, the actuator assembly 1 may be an optical device in which the movable part is a lens element but there is no image sensor. In other examples, actuator assembly 1 may be a type of apparatus that is not an optical device, and in which the movable element is not a lens element and there is no image sensor. In some examples, the actuator assembly 1 may be an optical device in which the movable part is a carriage supporting an image sensor where the lens carriage may be driven by another actuator, or not moveable at all.

The actuator assembly 1 also comprises a bearing arrangement 50 in the form of ball bearings 50 along plural guides 52 that supports the lens carriage 20 on the support structure 10. The ball bearings 50 and the guide are configured to guide movement of the lens carriage 20 with respect to the support structure 10 along the optical axis O which is therefore the movement direction in this example, while constraining movement of the lens carriage 20 with respect to the support structure 10 in other degrees of freedom.

The actuator assembly 1 also comprises a pair of SMA wires 40a, 40b arranged at an angle to each other, as well as to the movement direction. In operation, the SMA wires 40a, 40b drive movement of the lens carriage 20 along the optical axis O. Each of the SMA wires 40a, 40b is connected, at a first end, to the support structure 10 by a static crimp portion 42a fixed at the sidewall of the support structure. The static crimp portions 42a crimp the respective SMA wires 40a, 40b to provide both mechanical and electrical connection by respective electrical connectors 44a. The SMA wires 40a, 40b are also connected to moving crimp portions 42b provided on a flexure 30, which is attached to the lens carriage 20 at a connection tab 34. The crimp portions 42b are commonly connected to an electrical connector 44b by an electrical path 43. In the illustrated embodiment, the electrical path 43 is shown as a straight connector. In some other embodiment, the electrical path 43 may be replaced by a labyrinth path or a spring similar to the crimp plate 43 as shown in FIG. 3B. As a result, each of the SMA wire 40 is connected at one end to the support structure 10 and at the other end to the lens carriage 20 by the flexure 30.

Upon contraction the SMA wire 40a drive the lens carriage in the upward direction, whereas the SMA wire 40b drive the lens carriage in the opposite direction. The actuating forces by the SMA wires 40 also draw the lens carriage 20 towards, and therefore presses against, the respective sets of ball bearings 50. Advantageously, such an arrangement allows the actuating force from the SMA wire 40 to act directly against the ball bearings 50, and thereby reduces the amount of rattle between the lens carriage 20 and the support structure 10.

The flexure 30 have two opposite ends, one of which is attached to the SMA wire 40 whilst another end forms a contact portion 32 for engaging a corresponding surface of the support structure 10. More specifically, the flexure 30 causes the contact portions 32 to bias against the support structure 10 so as to generate frictional forces that constrain free movement in the lens carriage 20.

Compared to the embodiment of FIG. 5D, the flexure 30 of the embodiment as shown in FIG. 6B comprises two serially connected pivots. Such an arrangement allows the contact portion 32 to retract in the same direction as the wire contraction.

The flexure 30 generally comprises a set of inner flexure arms 33 nested inside a set of outer flexure arms 35. The outer flexure arms 35 have a static crimp 42b for connecting to the SMA wire 40. The outer flexure arms 35 comprises a protrusion 31 at a first end which is aligned with a corresponding protrusion 22 of the lens carriage 20. That is, the protrusion 31 is positioned further towards the first end of the outer flexure arms 35 than the crimp 42b.

The outer flexure arms 35, towards their second ends, are each pivotally connected to a corresponding inner flexure arm 33 by a linkage 36, at a location along the length of the inner flexure arms 33. Therefore, the outer flexure arms 35 are pivotable about the linkage 36, in relation to the inner flexure arms 33.

The inner flexure arms 33 are connected to a moveable end of the connection tab 34 at a first end by another linkage 38. Therefore, the inner flexure arms 33 are pivotable about the linkage 38, in relation to the lens carriage. The inner flexure arms 33 join up at their second end to form the contact portion 32, which is opposite to the first end of the outer flexure arms 35. Thus, the linkages 36 and 38 are serially connected by pivots along the flexure 30, between the protrusion 31 at the first end of the outer flexure arms 35 and the contact portion 32 towards the second end of the inner flexure arms 33.

Upon energising, the SMA wire 40 contracts and draws the protrusion 31 of the outer flexure arms 35 towards the corresponding protrusion 32 on the lens carriage 20 until they engage with each other. Therefrom, a pivot is formed between the protrusions 31, 32, thus allowing the actuating force to transfer through the outer flexure arms 35 to compress on the inner flexure arms 33 at the linkage 36 which, by pivoting motion at the linkage 38, causes the contact portion 32 to retract and to disengage from the surface of the support structure 10.

In the illustrated embodiment of FIGS. 6A to 6C, where the actuating force is applied at a distance closer to the fulcrum (e.g. linkage 36) than the load (e.g. the contacting point 32), the contacting point 32 is arranged to displace by a greater amount than a given contraction in the SMA wire 40. Advantageously, such an arrangement allows the contacting point 32 to be promptly retracted. Alternatively, the force may be applied at the same distance as, or at a distance further to the fulcrum, than the load, so as to overcome the biasing force by a stiffer biasing element. More specifically, the flexure 30 is a force modifying mechanism where the ratio of the input force to the output force can be suitable tailored to different applications.

Additionally, the actuating force comprises a force component along the movement direction for driving movement in the lens carriage 20.

The surface of the lens carriage 20 forms an endstop 70 which defines a limit of movement in the contact portion 32. As shown in FIG. 6A, as the SMA wires 40 energise, the actuating force causes the contact portion 32 to recede until the end of the inner flexure arms 33 (e.g. a portion adjacent to the linkage 38) abut or engage the endstop 70. Further contraction in the SMA wires 40 does not cause further retraction in the contact portion 32. Instead, the actuating force would solely be applied for driving the movement in the lens carriage 20, thus allowing a more precise position control.

Generally, the frictional forces are sufficient to constrain free movement in the lens carriage 20, yet not significant enough to resist relative movement between the lens carriage 20 and the support structure 10 when the SMA wires 40 are energised. In some embodiments, one or both of the contact portion 32 or the protrusion 22 of the support structure 10 may be provided with a material or a coating.

FIGS. 7A and 7B are respectively a truncated plan view and a side sectional view of an actuator assembly 1 according to an embodiment of the present invention.

The actuator assembly 1 is structurally and functionally similar to the actuator assembly 1 of FIGS. 6A to 6C. Like features are not described again. In this embodiment, the flexure 30 is a planar flexure of a different design.

The flexure 30 comprises two opposite ends, one of which is attached to the SMA wire 40 whilst another end forms a contact portion 32 for engaging a corresponding surface of the support structure 10. In this embodiment, the contact portion 32 of the flexure 30 is curved or bended inwardly, which corresponds to a curved or tapered surface profile on the support structure 10. More specifically, the flexure 30 causes the contact portions 32 to bias against the support structure 10 so as to generate frictional forces that constraints free movement in the lens carriage 20. The biasing force, therefore, is angled to the quadrilateral sides of the support structure 10.

Similar to the embodiment of FIGS. 6A to 6C, the flexure 30 of this embodiment as shown in FIG. 7B comprises two serially connected pivots. Such an arrangement allows the contact portion 32 to retract in the same direction as the wire contraction.

The flexure 30 generally forms from a set of inner flexure arms 33 nested inside a set of outer flexure arms 35. The flexure 30, as shown in FIG. 7A, has a planar profile. The outer flexure arms 35 having a crimp 42b for connecting to the SMA wire 40. The outer flexure arms 35 comprises a protrusion 31 at a first end which engages with a corresponding protrusion 22 of the lens carriage 20. Therefore, the outer flexure arms are pivotable about the protrusion 22 of the lens carriage 20. That is, the protrusion 31 is positioned further towards the first end of the outer flexure arms 35 than the crimp 42b.

The outer flexure arms 35, towards their second ends, are each pivotally connected to a corresponding inner flexure arm 33 by a linkage 36, at a location along the length of the inner flexure arms 33. Therefore, the outer flexure arms 35 are pivotable about the linkage 36, in relation to the inner flexure arms 33.

The inner flexure arms 33 are connected to a moveable end of the connection tab 34 at a first end by another linkage 38. Therefore, the inner flexure arms 33 are pivotable about the linkage 38, in relation to the lens carriage. The inner flexure arms 33 joins up at their second end to form the contact portion 32, which is opposite to the first end of the outer flexure arms 35. Thus, the linkages 36 and 38 are serially connected pivots along the flexure 30, between the protrusion 31 at the first end of the outer flexure arms 35 and the contact portion 32 towards the second end of the inner flexure arms 33.

Upon energising, the SMA wire 40 contracts and by the pivot formed between the protrusions 31, 32, the actuating force transfers through the outer flexure arms 35 to compress on the inner flexure arms 33 at the linkage 36 which, by pivoting motion at the linkage 38, causes the contact portion 32 to retract and to disengage from the surface of the support structure 10.

In the illustrated embodiment of FIGS. 7A and 7B, where the actuating force is applied at a distance closer to the fulcrum (e.g. linkage 36) than the load (e.g. the contacting point 32), the contacting point 32 is arranged to displace by a greater amount than a given contraction in the SMA wire 40. Advantageously, such an arrangement allows the contacting point 32 to be promptly retracted. Alternatively, the force may be applied at the same distance as, or at a distance further to the fulcrum, than the load, so as to overcome the biasing force by a stiffer biasing element. More specifically, the flexure 30 is a force modifying mechanism where the ratio of the input force to the output force can be suitable tailored to different applications.

Additionally, the actuating force comprises a force component along the movement direction for driving movement in the lens carriage 20.

The surface of the lens carriage 20 forms an endstop 70 which defines the range of movement in the contact portion 32. As shown in FIG. 7A, as the SMA wires 40 energise, the actuating force causes the contact portion 32 to recede until the end of the inner flexure arms 33 (e.g. a portion adjacent to the linkage 38) abut or engage the endstop 70. Further contraction in the SMA wires 40 do not cause further retraction in the contact portion 32. Instead, the actuating force is solely applied for driving the movement in the lens carriage 20, thus allowing a more precise position control.

Figure 8A:
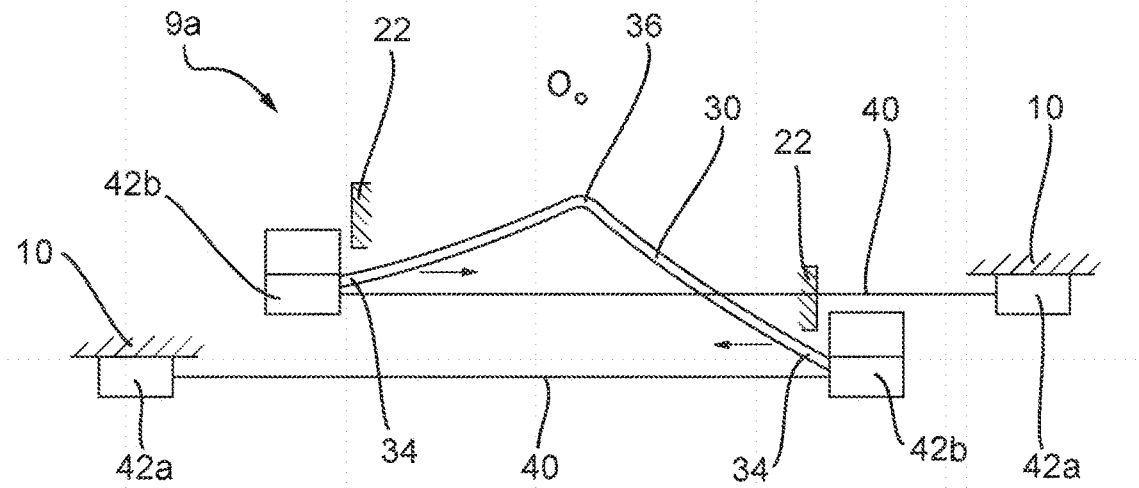
FIGS. 8A and 8B are partial schematic views of further embodiments of the present invention.

FIG. 8A is a truncated plan view of an actuator assembly 1 according to another embodiment of the present invention. Similar to the embodiment of FIGS. 6A to 6C, the actuator assembly 1 comprises a moveable part 20 that is supported on ball bearings and moveable along an optical axis O. For conciseness, like features are not shown again.

As shown in FIG. 8A, the actuator assembly 1 comprises a pair of opposing SMA wires 40 each having an end attached to the support structure 10 by a static crimp 42a and another end attached to the moveable part 20 by a moving crimp 42b. More specifically, the moving crimps 42b are connected to the moveable part 20 by flexible elements, e.g. planar crimp plates, so as to allow a degree of relative movement between the moving crimps 42b and the movable part 20. The SMA wires 40 are angled to the movement direction such that, upon contraction, they apply respective first force components for moving the moving part 20 in opposite movement direction for driving movement along the optical axis O, and respective second force components in opposite directions lateral to the optical axis O (shown as the arrows in FIG. 8A).

The actuator assembly 1 comprises a buckling flexure 30 having both ends fixedly attached to the moving crimps 42b. The term buckling flexure 30 herein generally refers to a flexible member having at least one kink 36 adjoining plural flexure arms. When subject to a compressive force, the kink 36 may increase in curvature, causing the two ends of the two buckling flexure 30 to move towards each other. The flexure arms may be stiff under compression, or they may bend.

Generally, the buckling flexure 30 may be used in lieu of the pivots arrangement as shown in FIGS. 5D, 6 and 7 as a force modifying mechanism. More specifically, when the SMA wires 40 are not energised, the buckling flexure 30, at its contact portions 32, biases against corresponding protrusions 22 extending from the support structure 10, and thereby generates frictional forces for constraining free movement in the moveable part 20.

Upon contraction in the SMA wires 40, the second force component compresses the buckling flexure 30, further bending the kink 36 of the bulking flexure 30, thereby causing the contact portions 32 to recede from their respective protrusion 22, e.g. along the arrows as shown in FIG. 8A. Advantageously, because of the bending in the kink 36, the use of buckling arms 30 permits the contact portions 32 to promptly retract from the protrusions 22 of the support structure.

The protrusion 22 also functions as an endstop which defines a limit of movement in the contact portion 32. As shown in FIG. 8A, as the SMA wires 40 energise, the actuating force causes the contact portion 32 to recede until the moving crimp 42b abuts or engages the protrusion 22. Further contraction in the SMA wires 40 do not cause further retraction in the contact portion 32. Instead, the actuating force would solely be applied for driving the movement in the lens carriage 20, thus allowing a more precise position control.

Generally, the frictional forces are sufficient to constrain free movement in the lens carriage 20, yet not significant enough to resist relative movement between the lens carriage 20 and the support structure 10 when the SMA wires 40 are energised. In some embodiments, one or both of the contact portion 32 or the protrusion 22 of the support structure 10 may be provided with a material or a coating as described.

In some other embodiments, the buckling flexure 30 may be toggled between a first configuration (e.g. when the contact portions 32 engage with the protrusions 22) and a second configuration (e.g. when the contact portions 32 disengage from the protrusions 22). More specially, the bucking flexure 30 may only be stable at the first configuration and the second configuration. Therefore, upon energising the SMA wires 40, the buckling flexure 30 may promptly toggle towards the second configuration.

Figure 8B:
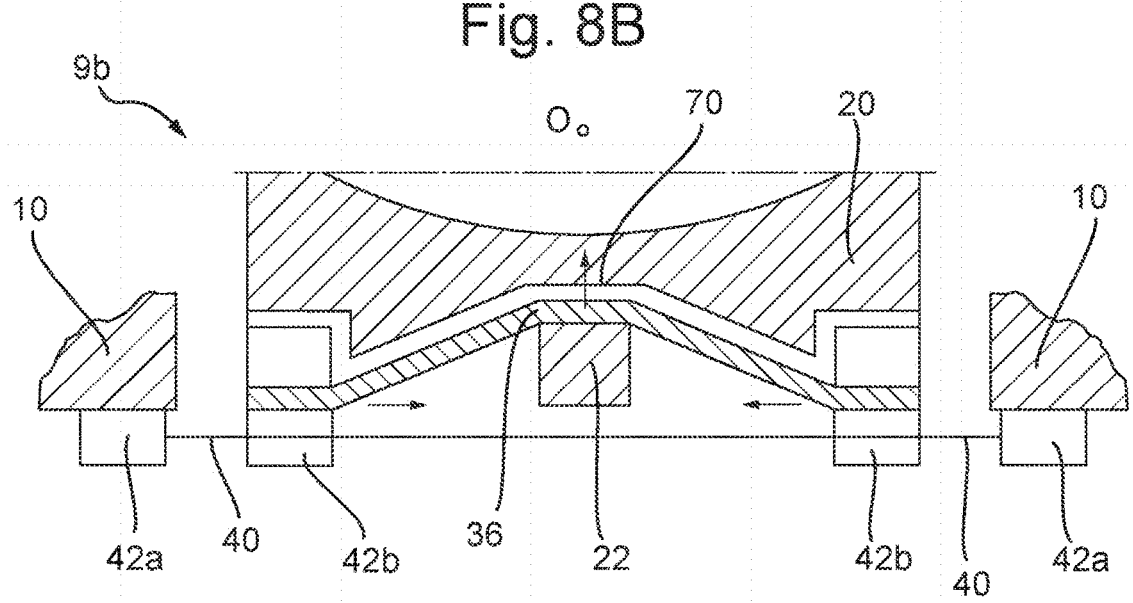

FIG. 8B is a truncated plan of an actuator assembly 1 according to another embodiment of the present invention. Similar to the embodiment of FIGS. 6A to 6C, the actuator assembly 1 comprises a moveable part 20 that is supported on ball bearings and moveable along an optical axis O. For conciseness, like features are not shown again.

As shown in FIG. 8B, the actuator assembly 1 comprises a pair of opposing SMA wires 40 each having an end attached to the support structure 10 by a static crimp 42a and another end attached to the moveable part 20 by a moving crimp 42b. More specifically, the moving crimps 42b are connected to the moveable part 20 by flexible elements, e.g. planar crimp plates, so as to allow a degree of relative movement between the moving crimps 42b and the movable part 20. The SMA wires 40 are angled to the movement direction such that, upon contraction, they apply respective first force components for moving the moving part 20 in opposite movement direction for driving movement along the optical axis O, and respective second force components in opposite directions lateral to the optical axis O (shown as the arrows in FIG. 8B).

The actuator assembly 1 comprises a buckling flexure 30 having both ends fixedly attached to the moving crimps 42b. The buckling flexure 30 comprises plural kinks 36 adjoining plural flexure arms. When subject to a compressive force, the kinks 36 may increase in curvature, causing the two ends of the two buckling flexure 30 to move towards each other. The flexure arms may be stiff under compression, or they may bend.

Similar to the embodiment of FIG. 8A, the buckling flexure 30 may be used as a force modifying mechanism. More specifically, when the SMA wires 40 are not energised, the buckling flexure 30, at its contact portions 32 (e.g. between the two kinks 36), biases against corresponding protrusions 22 extending from the support structure 10, and thereby generates frictional forces for constraining free movement in the moveable part 20.

Upon contraction in the SMA wires 40, the second force component compresses the buckling flexure 30, further bending the kinks 36 of the bulking flexure 30, thereby causing the contact portion 32 to move towards the moveable part 20 and to recede from the protrusion 22, e.g. along the arrows as shown in FIG. 8B. Advantageously, because of the bending in the kinks 36, the use of buckling arms 30 permits the contact portions 32 to promptly retract from the protrusions 22 of the support structure.

The surface of the movement part 20 also functions as an endstop 70 which limits movement of the contact portion 32. As shown in FIG. 8B, as the SMA wires 40 energise, the actuating force causes the contact portion 32 to recede until the buckling flexure 30 abuts or engages the protrusion. Further contraction in the SMA wires 40 do not cause further retraction in the contact portion 32. Instead, the actuating force is solely applied for driving the movement in the lens carriage 20, thus allowing a more precise position control.

In some other embodiments, the buckling flexure 30 may be toggled between a first configuration (e.g. when the contact portions 32 engage with the protrusions 22) and a second configuration (e.g. when the contact portions 32 disengage from the protrusions 22). More specially, the bucking flexure 30 may only be stable at the first configuration and the second configuration. Therefore, upon energising the SMA wires 40, the buckling flexure 30 may promptly toggle towards the second configuration.

Figure 9A:
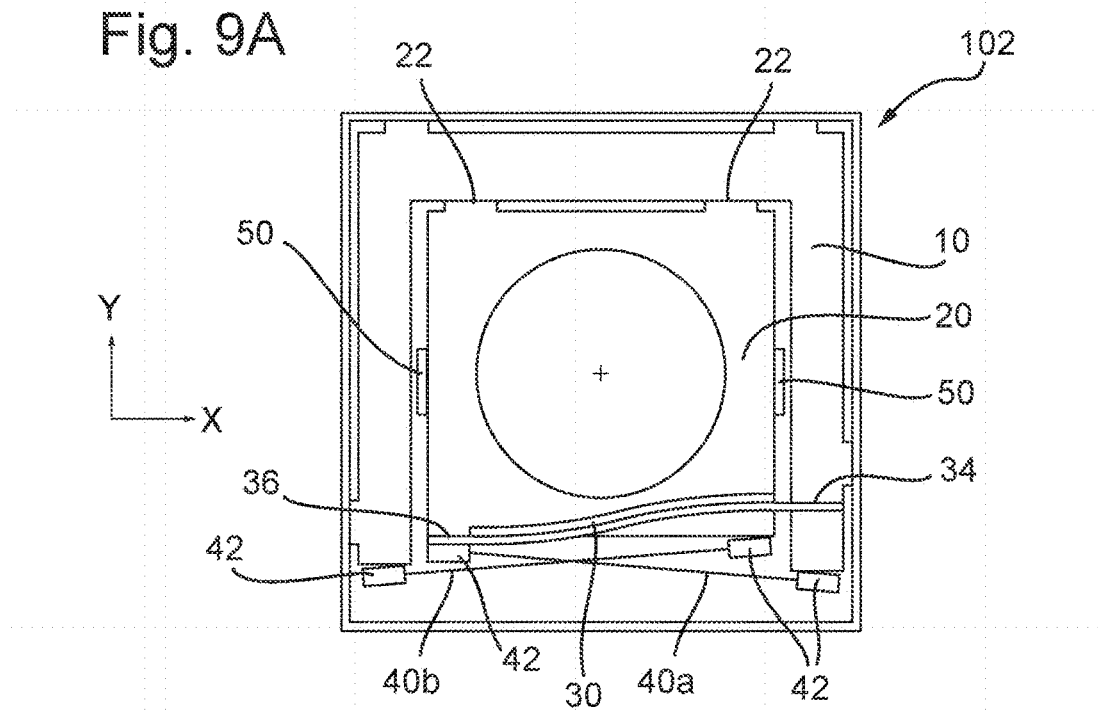
FIGS. 9A-D are schematic views of an actuator assembly that may act as an autofocus (AF) actuator assembly in a camera apparatus.
Figure 9B:
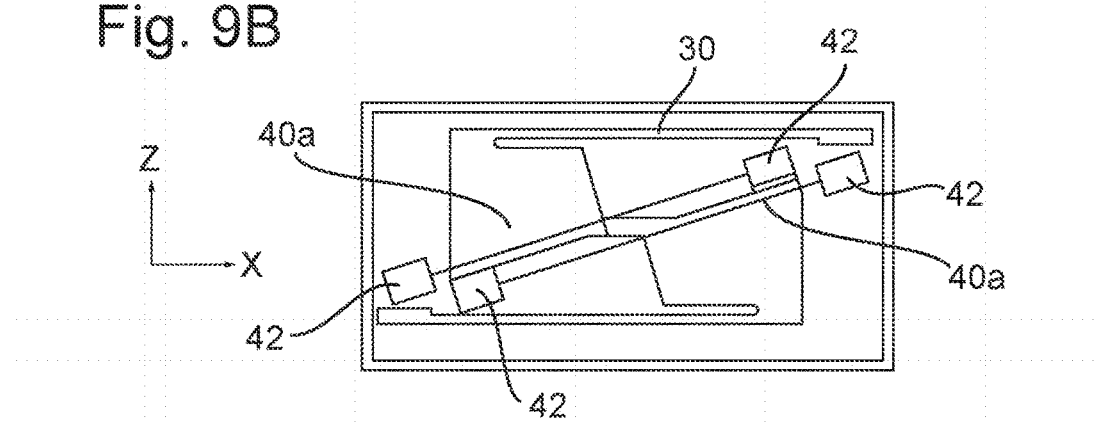

FIGS. 9A and 9B are respectively a plan view and a side sectional view of an actuator assembly 1 according to an embodiment of the present invention.

The SMA actuation apparatus 102 comprises a support structure 10 and a movable part 20. The support structure 10 and the movable part 20 are flat parallel sheets that face each other. A suspension system, comprising at least one or more flexures 30, supports the movable part 20 on the support structure 10 and guides movement of the movable part 20 with respect to the support structure 10 along the Z axis which is the movement axis O in this example. More specifically, the flexure 30 bears the moveable part 20 on the support structure and therefore can be considered as the bearing, or the only bearing. As described further below, the suspension system constrains translational movement of the movable part 20 with respect to the support structure 10 along the X and Y axes which are perpendicular to the Z axis.

Two SMA wires 40 are arranged as follows to drive movement of the movable part 20 with respect to the support structure 10 along the movement axis. The SMA wires 40 are each connected at one end to the support structure 10 by static crimp portions 42a and at the other end to the moveable part 20 by moveable crimp portions 42b. The static and movable crimp portions 42a, 42b crimp the SMA wires 40 to provide both mechanical and electrical connection.

The SMA wires 40 are inclined at a first acute angle $\theta$ with respect to a plane normal to the Z axis. The first acute angle $\theta$ is greater than 0 degrees so that it applies a first force component to the support structure 10 and the movable portion 10 along the Z axis, and so can drive movement along the Z axis. However, the inclination of the SMA wires 40 at the first acute angle $\theta$ provides gain as the SMA wires 40 rotate when they contract to drive the relative movement, thereby causing the amount of relative movement along the Z axis to be higher than the change in length of the wire.

The two SMA wires 40 are under tension and are opposed in the sense that they apply forces to the movable part 20 with respective first force components parallel to the Z axis that are in opposite directions. That is, as viewed in FIG. 9B, the SMA wire 40 that is uppermost is connected to the movable part 20 at its upper end and so applies a force on the movable part 20 with a downwards component along the Z axis, and the SMA wire 40 that is lowermost is connected to the movable part 20 at its lower end and so applies a force on the movable part 20 with an upwards component along the Z axis. Thus, the SMA wires 40 drive movement of the movable part 20 in opposite directions along the Z axis.

As shown in the plan view of FIG. 9A in which the two SMA wires 40 are inclined from parallel, as projected on the plane normal to the Z axis which is the movement axis. The components of force applied by the lengths of SMA wire 4 along the Y axis are in the same direction and so do not generate a couple.

In some embodiments, the suspension system does not comprise conventional bearings. That is, the flexure 30 bears the moveable part 20 on the support structure 10. Since the flexure 30 is most compliant in the movement direction, the flexure 30 may be considered to be a bearing for guiding movement of the moveable part 20.

In the illustrated example, the suspension system further comprises a bearing arrangement of two bearings 50 which are arranged as follows to permit movement of the movable part 20 with respect to the support structure 10 along the Z axis. The bearings 50 permits some degree of movement in the moveable part 20 along the Y-axis, while constraining or limiting other undesired movements that are not constrained by the flexures 30. The bearings 50 may alternatively be plain bearing elements. Each of the two bearings 50 may extend along the Z axis so as to permit movement of the movable part 20 with respect to the support structure 10 along the Z axis. There may be more than 2 bearings, and preferably they are spaced apart as far as possible within the extent of the actuator.

Figure 9C:
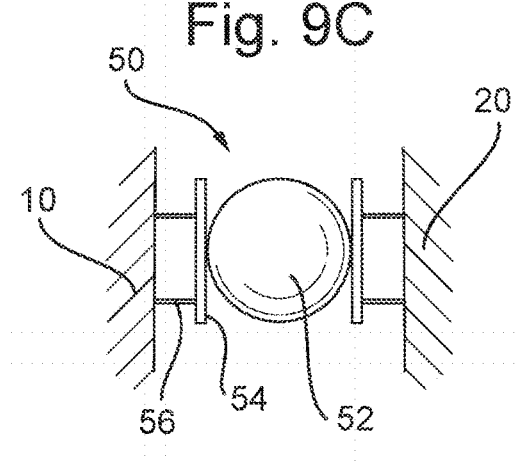
Figure 9D:
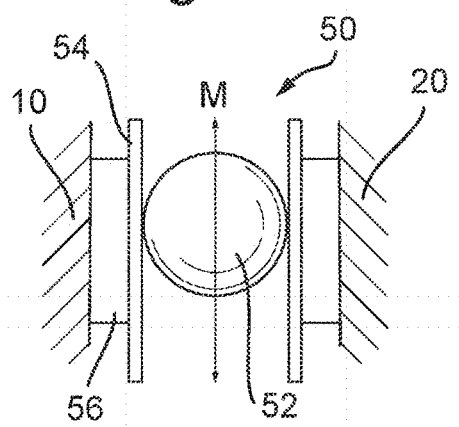

FIGS. 9C and 9D are respectively an enlarged plan view and an enlarged side sectional view of a bearing 50, applicable in the embodiment of FIGS. 9A and 9B. The bearing 50 comprises a ball bearing 52 running in a bearing race 54 extending along the Z-axis, so as to permit relative movement in the movement direction. The bearing race 54 is connected to the support structure 10 and the moveable part 20 by resilience elements 56 that are compliant only in the Y direction. More specifically, the resilience elements 56 are planar flexures which is sufficiently thin (as view in FIG. 13C) to comply along the Y-axis so as to provide a limited movement in the bearing race 54 orthogonal to the Z-axis. As such, the flexure 30 may bias the moveable part 20 against the protrusions 22 of the support structure 10 to generate frictional forces.

The two bearings 50 are spaced apart along the X axis. As a result, the reactive forces generated within the bearings 50 act together to constrain rotational movement of the movable part 50 with respect to the support structure 10 about the Z axis.

As described, the moveable part 20 is supported by the pair of flexures 30 and the bearings 50. FIGS. 9A and 9B only show a single flexure 30 where the other flexure 30, arranged in an opposite manner, is not shown. The flexure 30 is attached to the support structure 10 and the moveable part 20 by respectively a first end 34 and a second end 36. The first end 34 and the second end 38 are connected by a flexure arm 38 and are moveable relative to each other along at least the Y and Z axes. More specifically, the flexure arm 38 is compliant in Y and Z direction which allows such relative movements.

As shown in the plan view of FIG. 9A, the flexure arm 38 is curved along its length. When the SMA wire 40a is not energised, the flexure 30 is configured to bias the moveable part 20 against the support structure 10. More specifically, the moveable part 20 is engaged with, and biased against contacting surfaces at protrusions 22 that are formed on a sidewall of the support structure. The biasing force from the flexure 30 generates frictional forces at the contacting surfaces, which are sufficient for constraining movement in the second part when the one or more SMA wires are not energised.

As the SMA wire 40 energises, a second force component of the actuating force acts against the biasing force exerted by the flexure 30, causing the moveable part 20 to recede, in a direction lateral to the optical axis, from the contacting surface of the protrusion. Thus, upon energising the SMA wire 40, the frictional forces at the contacting surface reduce. This allows the first force component of the actuating force to drive movement of the moveable part 20 along the Z axis whilst being fully supported by the bearings 50.

In some embodiment, further contraction in the SMA wire 40 causes the moveable part 20 to disengage from the protrusion 22 of the support structure 10, thereby eliminating friction therebetween.

In contrast to the prior art example 100, the contacting surface on protrusion 22 is distinct from a bearing 50 (if present) in the actuator assembly 1, yet allowing the moveable part 20 to be fully supported and guided over the range of movement. In addition, the contacting surface on protrusion 22 is provided on a different surface/side of actuator assembly 1 to the bearing 50 (if present). Thus, the generated frictional forces at the contacting surface are decoupled from the bearing surface. So, the two surfaces can be individually tailored to suit their needs. Advantageously, in comparison to the prior art embodiment, the present invention provides a more precise position control when holding the second part in place. Furthermore, because the contacting surface does not require the incorporation of bearings, a wider range of surface profiles may be used for generating the frictional forces.

Figure 10A:
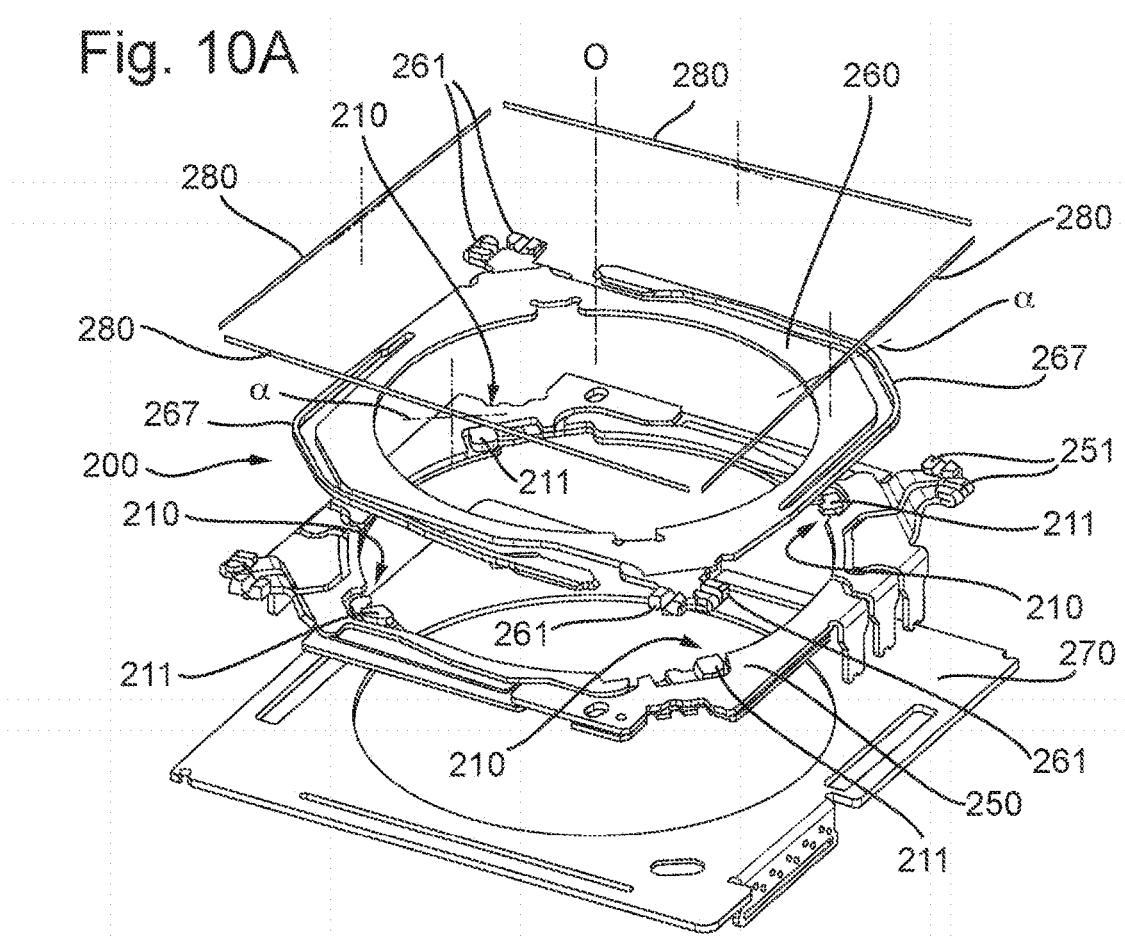
FIGS. 10A-D are schematic views of an actuator assembly that may act as an optical image stabilization (OIS) actuator assembly in a camera apparatus.
Figure 10B:
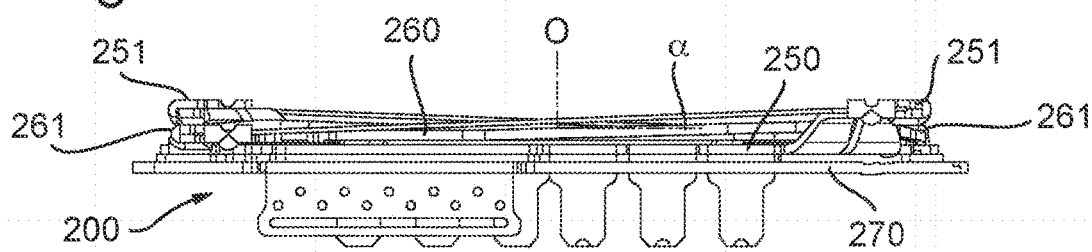
Figure 10C:
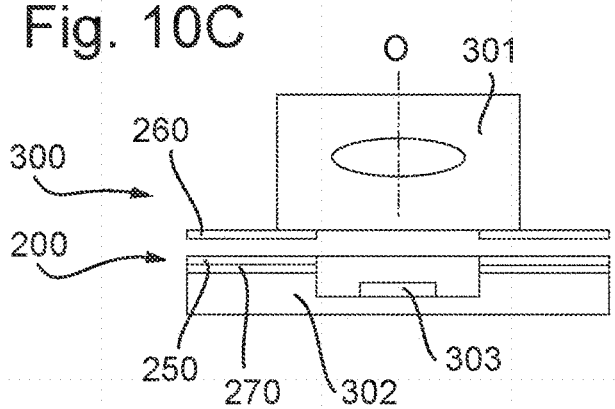

FIGS. 10A, 10B and 10C are respectively an exploded perspective view, an enlarged side cross-sectional view and a side schematic diagram of an actuator assembly 200 according to an embodiment of the present invention. The actuator assembly 200 is suitable for providing optical image stabilisation (OIS) when incorporated in a camera apparatus or other optical apparatus. The actuator assembly 200 is arranged as described below, but in general terms has a similar arrangement and function to the actuator arrangement described in WO 2017/755788, except for some differences described below. Accordingly, reference is made to WO 2017/755788.

The actuator assembly 200 includes a support plate 250 and a movable part 260, which are the first part and the second part, respectively, in this example. The movable part 260 is movable with respect to the support structure 260.

The support structure 250 and the movable part 260 are integral sheets made of metal, for example steel such as stainless steel. The support structure 250 is fixed to a support sheet 270.

The movable part 260 supports a lens assembly 301. The support sheet 270 is fixed to a base 302 on which an image sensor 303 is mounted, although in other types of optical apparatus the image sensor 303 may be omitted. In general, the movable part 260 may support the image sensor 303 and the lens assembly 301 may be mounted on the base 302. Each of the support structure 250 and the movable part 260 is provided with a central aperture aligned with an optical axis O allowing the passage of light from the lens assembly 301 to the image sensor 303 to allow the image sensor 303 to capture an image formed by the lens assembly 301.

Figure 10D:
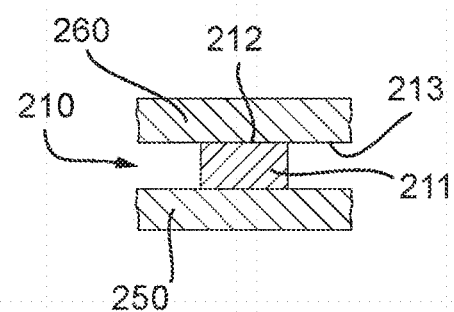

The actuator assembly 200 includes four plain bearings 210 spaced around the optical axis O and each having a structure shown in more detail in FIG. 10D. Each plain bearing 210 comprises a bearing element 211 mounted on the support structure 250, for example by adhesive, and a bearing surface 212 which is a surface of the movable part 260. The bearing element 211 bears on the bearing surface 212. In particular, an outer surface 213 of the bearing element 211 contacts the bearing surface 212, the outer surface 213 of the bearing element 211 and the bearing surface 212 conforming with each other. The plain bearings 210 may be arranged as described in further detail in WO 2017/755788.

Thus, the movable part 260 is capable of movement relative to the static plate 260 across the bearing surfaces 212 of the plain bearings 210 in any direction in two dimensions orthogonal to the optical axis O.

As an alternative, the plain bearings 210 may be reversed to comprise a bearing element mounted on the movable part 260 and a bearing surface which is a surface of the support structure 250. In that case, the support structure 250 would form the first part and the movable part 260 would form the second part. In that sense, the lens assembly 301 may be mounted on either one of the first and second parts.

The actuator assembly 200 includes comprises two flexures 267 connected between the support structure 250 and the movable part 260. In this example, the flexures 267 are formed integrally with the movable part 260 at one end thereof and are mounted to the support structure 250 at the other end thereof, although the flexures 267 could be formed integrally with the support structure 250 and mounted to the movable part 260, or else could be separate elements mounted to each of the support structure 250 and the movable part 260.

The flexures 267 are resilient and are therefore resilient biasing elements. The flexures 267 are arranged to act as a resilient biasing arrangement biasing the support structure 250 into contact with bearing surfaces 212 of the movable part 260. This may be achieved by configuring the flexures 267 so that they are deflected from their relaxed state to provide a pre-loading force that provides the biasing. This generates a reaction between the movable part 260 and the bearing surfaces 212, as well as generating frictional forces between the movable part 260 and the bearing surfaces 212.

Simultaneously, the flexures 267 permit movement of the movable part 260 relative to the support structure 250 orthogonal to the optical axis O.

The flexures 267 are made of a suitable material that provides the desired mechanical properties and is electrically conductive so that the flexures 267 may electrically connect SMA wires 280 that are connected thereto, for carrying the drive current supplied to the SMA wires 280. Typically, the material is a metal having a relatively high yield, for example steel such as stainless steel.

The second actuator assembly 200 also includes four SMA wires 280 connected between the support structure 250 and the movable part 260. Specifically, the support structure 250 is formed with crimps 251 and the movable part 260 is formed with crimps 261, wherein the crimps 251 and 261 crimp the four SMA wires 280 so as to connect them to the support structure 250 and the moving plate 260. In contrast to arrangement disclosed in WO 2017/755788 of the SMA wires 280 extending perpendicular to the optical axis O, each SMA actuator wire 280 is inclined at an acute angle $\alpha$ of greater than 0° with respect to the bearing surfaces 212 so as to apply a force ("upforce"), on contraction of the SMA actuator wire 280, with a component normal to the bearing surfaces 212 that biases the support structure 250 away from the bearing surfaces 212 and with a component parallel to the bearing surfaces 212.

The SMA wires 280 have an arrangement around the optical axis O which is the same as that described in WO 2017/755788 so that each SMA wires 80 applies a component of force parallel to the bearing surfaces 212 in different directions and the SMA wires 280 are capable of driving movement of the movable part 260 relative to the support structure 250 in two dimensions across the bearing surfaces 212.

As the SMA wires 280 are opposed, their average tension and hence the upforce can be controlled at least substantially independently of the movement.

The SMA wires 280 are each connected to a control circuit which may be implemented in an integrated circuit chip. The control circuit in use applies drive signals to the SMA wires 280 which resistively heat the SMA wires 280 causing them to contract. In operation, the SMA wires 280 are selectively driven to move the movable part 260 relative to the support structure 250 along a movement axis in any direction orthogonal to the optical axis O. Such control may be used to move the lens assembly relative to image sensor orthogonally to the optical axis O so as to provide OIS as described in WO 2017/755788.

In the absence of drive signals being applied, the SMA wires 280 do not contract, and so the flexures 267 bias the movable part 260 onto the bearing surfaces 212 generating frictional forces that are sufficient to retain the movable part 260 in position on the bearing surfaces 212. In this state, the movable part 260 is retained in position with zero power consumption by the second actuator assembly 200.

The flexures 267 may be designed to provide sufficient frictional forces to reduce motion and thereby improve stability of the second actuator assembly 200 and/or reduce the risk of audible noise when the SMA wires 280 are in an unpowered state. This is important as being able to turn off OIS in situations where it is not effective (e.g. very high light levels) will reduce power consumption. In such a state, the frictional forces should retain the movable part 260 in position on the bearing surfaces 212 in the event of typical forces acting on the second actuator assembly 200, including gravitational forces which can lead to movement that is dependent on the orientation (posture dependence) and inertial impact forces. Otherwise, there is a risk that the second actuator assembly 200 is insufficiently stable and/or that audible noise is generated (e.g. between the movable part 260 and the bearing surfaces 212 or between the lens assembly 301 and an enclosure of the camera apparatus) when the second actuator assembly 200 vibrates, for example due to a haptic effect of a device such as a mobile telephone in which the second actuator assembly 200 is incorporated. When the second actuator assembly 200 is unpowered the SMA wires 280 will slacken off and not exert much force. The position of the lens assembly 301 will therefore be determined by the interaction of the following forces:

the combined weight of the lens assembly 301 and the movable part 260;
the stiffness of the flexures 267 (in the movement plane);
the frictional forces; and
inertia (when accelerating)

For example, when the camera apparatus is held with the optical axis O horizontal the lens position will "sag" until the restoring force of the flexures 267 and frictional forces counterbalance the weight.

Generally, the frictional forces and hence the strength of the biasing force from the flexures 267 need to be increased with increasing mass of the cameral lens assembly that is to be mounted on the movable part 260.

Additionally, when the camera is accelerated hard inertia may move the lens assembly 301 relative the image sensor 303. Both effects are undesirable, leading to blur from the motion and potential interference with OIS. A rigid stable system is desired for optimal OIS performance. The frictional forces generated between the movable part 260 and the bearing surfaces 212 in the absence of contraction of the SMA wires 280 may be less than the combined weight of the lens assembly 301 and the movable part 260. In that case, the movable part 260 is maintained in position on the bearing surfaces 212 under the effect of gravitational forces when the camera apparatus is held with the optical axis horizontal and ignoring the other forces in the system.

If frictional forces of a suitable level to achieve these effects were encountered when the SMA wires 280 were driven, then this may hinder OIS performance. However, due to the inclination of the SMA wires 280, the force applied by the SMA wires 280 on the support structure 250 has a component normal to the bearing surfaces 212 that biases the support structure 250 away from the bearing surfaces 212, thereby reducing the frictional forces therebetween so as to reduce the impact on OIS performance.

In order to provide an appropriate degree of reduction, the ratio between (i) the frictional forces generated when the SMA wires 280 drive the maximum degree of relative movement of the movable part 260, and (ii) the frictional forces generated in the absence of contraction of the SMA wires 280 may be less than 0.9 and more preferably less than 0.7. The inventors have found that this can be achieved with practical sets of design parameters, which includes, amongst other things, an angle $\alpha$ of greater than 0.5°. In smaller actuators, angles of 0.5° or less are generally associated with unpractically small height differences between the ends of the SMA wires 280 whereas, in larger actuators, such small angles generally do not provide sufficient upforce. Larger angles may be used but generally lead to taller actuators.

In order to constraint free movement in the moveable part 20 when the wire are not energised, the plain bearings 210 may be provided with, amongst others, a surface coating or a material. The coefficient of friction of the plain bearings 210, e.g. by surface roughness, is in the range of 0.05 to 0.6, or in the range of 0.1 to 0.4, or preferably in the range of 0.05 to 0.4. Such an arrangement may allow the biasing arrangement to generate sufficient frictional forces to keep the second part in position when the SMA wires 280 are not energised, yet not presenting a significant resistance to the movement in the second part.

FIGS. 11 and 12 show further embodiments of an actuator assembly according to the present invention. The mechanics of these actuator assemblies 1 are described, for example, in WO 2013 175197 A1 or WO 2017 072525 A1, which are herein incorporated by reference.

The actuator assemblies 1 comprise a support structure 10 and a movable part 20. The movable part 20 is movable in a movement plane within a range of movement. In particular, the movable part 20 may be movable both translationally and rotationally in the movement plane, i.e. with three DOFs in the movement plane. The actuator assembly 1 comprises a total of four SMA wires 40 connected between the movable part 20 and the support structure 10 in an arrangement wherein none of the SMA wires 40 are collinear, and wherein the SMA wires 40 are capable of being selectively driven to move the movable part 10 relative to the support structure to any position in said range of movement without applying any net torque to the movable part 20 around a primary axis perpendicular to the movement plane.

For example, two of the SMA wires 40 may be connected between the movable part 20 and the support structure 10 to each apply a torque to the movable part 20 in said movement plane around the primary axis in a first sense around the primary axis and the other two SMA wires 40 are connected between the movable part 20 and the support structure 10 to each apply a torque to the movable part in said movement plane around the primary axis in a second, opposite sense around the primary axis. The four SMA wires 40 may be arranged in a loop at different angular positions around the primary axis, successive SMA wires around the primary axis being connected to apply a force to the movable element in alternate senses around the primary axis.

In general, fewer than four SMA wires 40 may be provided, for example two SMA wires 40 for driving movement of the movable part translationally in the plane (and opposed by resilient elements, such as springs) or three SMA wires 40 for driving movement of the movable part translationally in the plane.

A lens assembly may be fixed relative to the movable part and an image sensor may be fixed relative to the support structure, as described in WO 2013 175197 A1. Alternatively, an image sensor may be fixed relative to the movable part and a lens assembly may be fixed relative to the support structure, as described in WO 2017 072525 A1. In either case, movement of the lens relative to the image sensor may effect OIS.

Figure 11A:
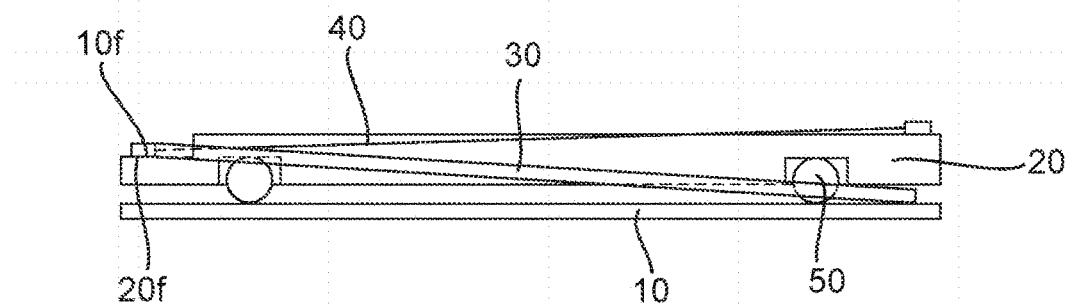
FIGS. 11A-B are schematic views of another actuator assembly that may act as an optical image stabilization (OIS) actuator assembly in a camera apparatus.
Figure 11B:
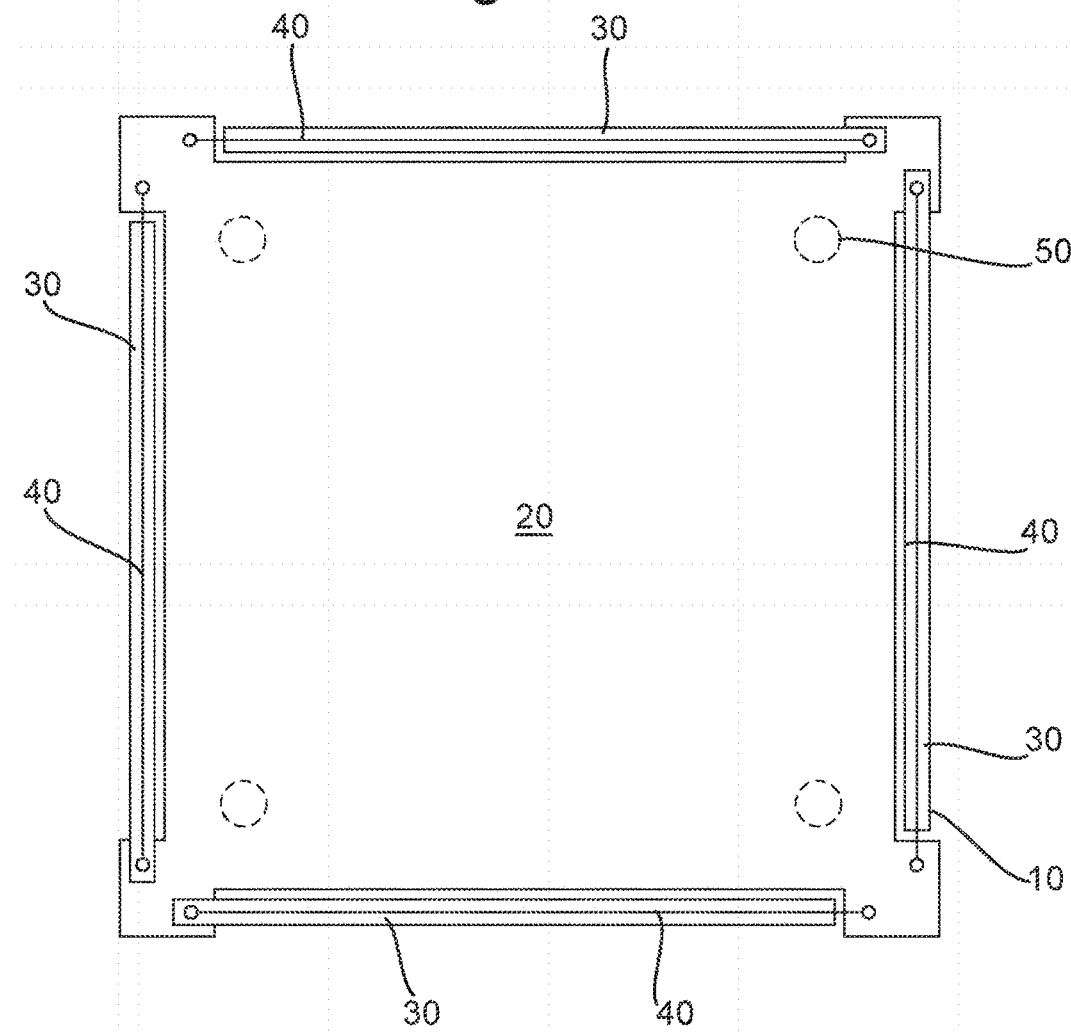

FIG. 11A shows a side view and FIG. 11B shows a plan view of an actuator assembly 1. The biasing arrangement 30 is comprised by the support structure 10. So, the biasing arrangement 30 remains static with the support structure 10 upon movement of the movable part 20. Put another way, the support structure 10 comprises two portions that are coupled via a resilient element of the biasing arrangement 30.

In particular, the biasing arrangement 30 comprises four resilient elements in the form of four flexures. A first end of each of the flexures is fixed relative to the support structure 10. An SMA wire 40 is connected to the second end of each flexure. The second end of each flexure comprises the first friction surface 10*f* that engages the second friction surface 20*f* on the movable part 20. The flexure is preloaded so as to bias the friction surfaces 10*f*, 20*f* together. The flexures additionally provide a biasing force to urge the bearing arrangement 50, which in the depicted embodiment is in the form of a ball bearing.

In the embodiment of FIG. 11, the flexures are angled relative to the SMA wires. As a result, the flexures may be deformed (e.g. upward in FIG. 12B) on contraction of the SMA wire 40. The frictional force F between the friction surfaces 10*f*, 20*f* may thereby be reduced. In particular, in the opposing wire configuration of FIG. 11, equal contraction of the SMA wires 40 may reduce the frictional force F without movement of the movable part 20, whereas differing contraction of the SMA wires 40 may result in movement of the movable part 20.

Figure 12A:
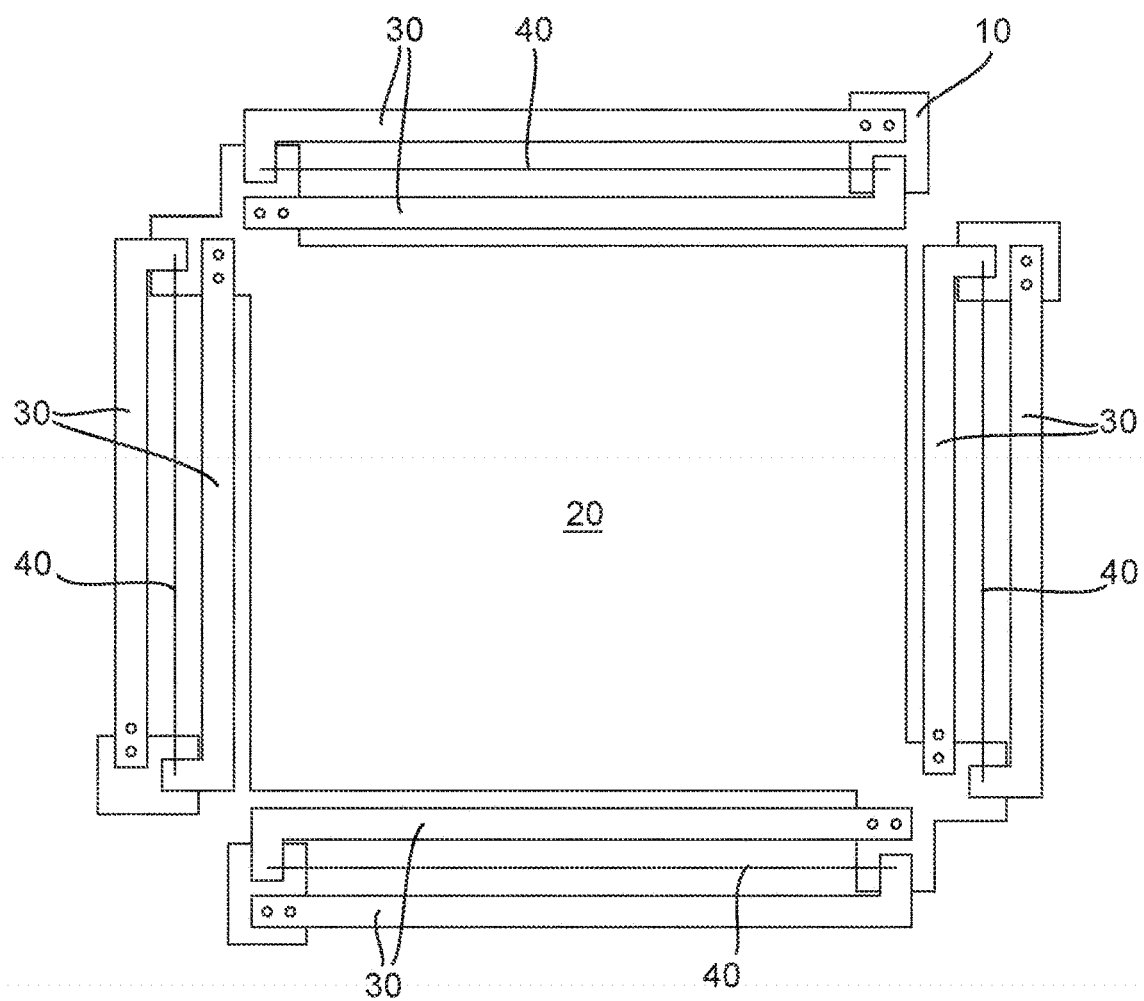
FIGS. 12A-B are schematic views of another actuator assembly that may act as an optical image stabilization (OIS) actuator assembly in a camera apparatus.
Figure 12B:
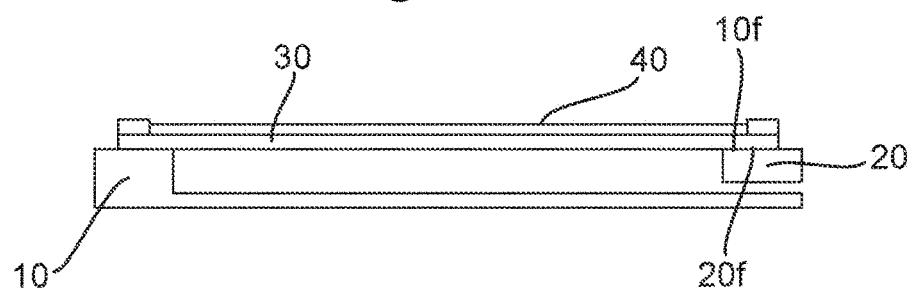

FIG. 12A shows a plan view and FIG. 12B shows a side view of an actuator assembly 1. The biasing arrangement 30 is comprised partly by the support structure 10 and partly by the movable part 20.

So, part of the biasing arrangement 30 remains static with the support structure 10 upon movement of the movable part 20, and part of the biasing arrangement 30 moves with the movable part 20 upon movement of the movable part 20. In particular, the biasing arrangement 30 comprises four pairs of resilient elements, in the form of four pairs of flexures, each pair comprising a first flexure and a second flexure.

A first end of each of the first flexures is fixed relative to the support structure 10. A first end of each of the second flexures is fixed relative to the movable part 20. An SMA wire 40 is connected between the second end of each pair of flexures. The second end of each flexure comprises a first friction surface 10*f* that engages a respective second friction surface 20*f* on the movable part 20. The flexures are preloaded so as to bias the friction surfaces 10*f*, 20*f* together. The flexures may additionally provide a biasing force to load the bearing arrangement 50.

In the embodiment of FIG. 12, the SMA wires 40 are parallel to the flexures. However, the SMA wires are offset from the pair of flexures (i.e. spaced above the flexures in FIG. 12B), i.e. the SMA wire 40 is not arranged in the same plane as the respective flexures. As a result, the flexures may be biased (e.g. upward in FIG. 12B) on contraction of the SMA wire 40. The frictional force F between the friction surfaces 10*f*, 20*f* may thereby be reduced.

There is thus provided an actuator assembly comprising a support structure comprising a first friction surface and a movable part comprising a second friction surface engaging the first friction surface, one or more SMA wires arranged, on contraction, to move the movable part relative to the support structure to any position within a range of movement, a biasing arrangement arranged to bias the first and second friction surfaces against each other with a normal force, thereby generating a static frictional force that constrains the movement of the movable part relative to the support structure at any position within the range of movement when the one or more SMA wires are not contracted. The biasing arrangement may be comprised by the movable part or by the support structure. This includes being comprised partly by the movable part and partly by the support structure. So, the biasing arrangement may to move with the movable part or remain static relative to the support structure. The biasing arrangement is arranged to apply the normal force only in a direction perpendicular to the range of movement at any position within the range of movement. The one or more SMA wires are arranged, on contraction, to reduce the normal force between first and second friction surfaces.

The actuator assembly 1 may comprise a total of four SMA wires 40. The SMA wires 40 may be arranged so as to drive movement of the movable part 20 in three degrees of freedom in a movement plane. The friction surfaces 10f, 20f may be parallel to the movement plane. The biasing arrangement comprises a resilient element that is comprised by the movable part and/or a resilient element that is comprised by the support structure. Each resilient element is connected at one end to one of the movable element or to the support structure, and at the other end to a respective SMA wire. The other end of the respective SMA wire is connected to the other of the movable element or to the support structure, or to another resilient element that is connected to the other of the movable element or to the support structure. Each resilient element may bias friction surfaces 10f, 20f against each other. Each resilient element may load a bearing arrangement comprised by the actuator assembly 1. The resilient element may be angled relative to the SMA wire. Alternatively, the resilient element may be parallel to the SMA wire, but the SMA wire may no be co-planar with the resilient element.

The term 'shape memory alloy (SMA) wire' may refer to any element comprising SMA. The SMA wire may be described generally as an SMA element. The SMA element may have any shape that is suitable for the purposes described herein. The SMA element may be elongate and may have a round cross section or any other shape cross section. The cross section may vary along the length of the SMA element. The SMA element might have a relatively complex shape such as a helical spring. It is also possible that the length of the SMA element (however defined) may be similar to one or more of its other dimensions. The SMA element may be sheet-like, and such a sheet may be planar or non-planar. The SMA element may be pliant or, in other words, flexible. In some examples, when connected in a straight line between two components, the SMA element can apply only a tensile force which urges the two components together. In other examples, the SMA element may be bent around a component and can apply a force to the component as the SMA element tends to straighten under tension. The SMA element may be beam-like or rigid and may be able to apply different (e.g. non-tensile) forces to elements. The SMA element may or may not include material(s) and/or component(s) that are not SMA. For example, the SMA element may comprise a core of SMA and a coating of non-SMA material. Unless the context requires otherwise, the term 'SMA element' may refer to any configuration of SMA material acting as a single actuating element which, for example, can be individually controlled to produce a force on an element. For example, the SMA element may comprise two or more portions of SMA material that are arranged mechanically in parallel and/or in series. In some arrangements, the SMA element may be part of a larger SMA element. Such a larger SMA element might comprise two or more parts that are individually controllable, thereby forming two or more SMA elements. The SMA element may comprise an SMA wire, SMA foil, SMA film or any other configuration of SMA material. The SMA element may be manufactured using any suitable method, for example by a method involving drawing, rolling or deposition and/or other forming process(es). The SMA element may exhibit any shape memory effect, e.g. a thermal shape memory effect or a magnetic shape memory effect, and may be controlled in any suitable way, e.g. by Joule heating, another heating technique or by applying a magnetic field.

In general, although the present invention has been described in relation to an SMA wire, actuator components other than SMA wires may be used. For example, a voice coil motor (VCM), piezoelectric element or other actuator may be used in place of the SMA wire in any of the above-described embodiments. As such, any reference to SMA wire in the above may be replaced with actuator component, and any reference to contraction of an SMA wire with actuation of the actuator component.

Aspects of the present invention are set out in the following clauses. The claims of the present application are provided further below under the heading "claims".

1. An actuator assembly comprising:
    a support structure comprising a first friction surface;
    a movable part comprising a second friction surface engaging the first friction surface;
    one or more SMA wires arranged, on contraction, to move the movable part relative to the support structure to any position within a range of movement;
    a biasing arrangement arranged to bias the first and second friction surfaces against each other with a normal force, thereby generating a static frictional force that constrains the movement of the movable part relative to the support structure at any position within the range of movement when the one or more SMA wires are not contracted,
    wherein the biasing arrangement is comprised by the movable part or by the support structure so as to move with the movable part or remain static relative to the support structure, and is arranged to apply the normal force only in a direction perpendicular to the range of movement at any position within the range of movement;
    wherein the one or more SMA wires are arranged, on contraction, to reduce the normal force between first and second friction surfaces.

2. An actuator assembly according to clause 1, wherein the movable part comprises two portions that are coupled via the biasing arrangement or wherein the support structure comprises two portions that are coupled via the biasing arrangement.

3. An actuator assembly according to clause 1 or 2, wherein the biasing arrangement comprises a resilient element.

4. An actuator assembly according to clause 3, wherein the biasing arrangement comprises one or more flexures.

5. An actuator assembly according to any preceding clause, wherein the actuator assembly comprises a bearing arrangement for bearing movement of the movable part relative to the support structure.

Optionally, wherein the biasing arrangement is arranged to load the bearing arrangement.

6. An actuator assembly according to clause 2 and clause 5, wherein the bearing arrangement is provided on one portion of the support structure or movable part, and wherein the first or second friction surface is provided on the other portion of the support structure or movable part.

7. An actuator assembly according to clause 6, wherein the one or more SMA wires are coupled to the other portion of the support structure or movable part.

8. An actuator assembly according to clause 6 or 7, wherein the other portion of the support structure or movable part is formed integrally with the biasing arrangement.
9. An actuator assembly according to any one of clauses 5 to 8, wherein the one or more SMA wires are arranged, on contraction, to load the bearing arrangement.
10. An actuator assembly according to any one of clauses 5 to 9, wherein the bearing arrangement comprises a rolling bearing, the rolling bearing comprising a support bearing surface on the support structure, a movable bearing surface on the movable part and a rolling bearing element arranged between the support bearing surface and the movable bearing surface.
11. An actuator assembly according to clause 10, wherein the support bearing surface and movable bearing surface are parallel to the first and second friction surfaces.
12. An actuator assembly according to any one of clauses 5 to 9, wherein the bearing arrangement comprises a plain bearing formed between an engaging surface on the support structure in engagement with a corresponding engaging surface on the movable part.
13. An actuator assembly according to any one of clauses 5 to 12, wherein the bearing arrangement is separate from the first and second friction surfaces.
14. An actuator assembly according to any one of clauses 5 to 13, wherein the bearing arrangement constrains movement of the movable part relative to the support structure to movement in three degrees of freedom.
15. An actuator assembly according to clause 14, wherein the bearing arrangement constrains movement of the movable part relative to the support structure to movement in a movement plane.
16. An actuator assembly according to any one of clauses 5 to 13, wherein the bearing arrangement constrains movement of the movable part relative to the support structure to movement in one degree of freedom.
17. An actuator assembly according to clause 16, wherein the bearing arrangement constrains movement of the movable part relative to the support structure to helical movement about a helical axis.
18. An actuator assembly according to clause 16, wherein the bearing arrangement constrains movement of the movable part relative to the support structure to translational movement along a movement axis or rotational movement about a rotation axis.
19. An actuator assembly according to any preceding clause, wherein the one or more SMA wires are arranged, on contraction, to reduce the normal force between first and second friction surfaces by at least 10%, preferably at least 20%, most preferably by at least 50%.
20. An actuator assembly according to any preceding clause, wherein the one or more SMA wires are arranged, on contraction, to disengage the first and second frictional surfaces.
21. An actuator assembly according to any preceding clause, wherein the one or more SMA wires are arranged, on contraction, to lift at least a portion of the movable part into engagement with an endstop.
22. An actuator assembly according to clause 21, wherein the endstop is arranged on another portion of the movable part.
23. An actuator assembly according to any preceding clause, wherein the ratio of the static frictional force to weight of the movable part is greater than 1, preferably greater than 3, further preferably greater than 5.
24. An actuator assembly according to any preceding clauses, wherein the coefficient of static friction between the first and second friction surfaces is in the range between 0.05 and 0.6, preferably in the range between 0.1 and 0.4.
25. An actuator assembly according to any one of the preceding clauses, wherein the one or more SMA wires apply forces to the movable part that are angled relative to the first and second friction surfaces.
26. An actuator assembly according to any one of the preceding clauses, wherein the one or more SMA wires are angled relative to the first and second friction surfaces.
27. An actuator assembly according to any one of the preceding clauses, wherein the one or more SMA wires are angled with respect to one or more directions of movement of the movable part relative to the support structure.
28. An actuator assembly according to any one of the preceding clauses, wherein the one or more SMA wires comprise at least two opposing SMA wires arranged, on contraction, to both reduce the normal force between first and second friction surfaces, and to move the movable part in opposite directions within the range of movement.
1a. An actuator assembly comprising:
   a support structure comprising a first friction surface;
   a movable part comprising a second friction surface engaging the first friction surface;
   a bearing arrangement for bearing movement of the movable part relative to the support structure within a range of movement;
   one or more SMA wires arranged, on contraction, to move the movable part relative to the support structure to any position within the range of movement;
   a biasing arrangement arranged to bias the first and second friction surfaces against each other with a normal force, thereby generating a static frictional force that constrains the movement of the movable part relative to the support structure at any position within the range of movement when the one or more SMA wires are not contracted,
   wherein the one or more SMA wires are arranged, on contraction, to lift the movable part off the first friction surface such that the movable part bears on the bearing arrangement.
Optionally, wherein the biasing arrangement is arranged to load the bearing arrangement.
2a. An actuator assembly according to clause 1a, wherein the biasing arrangement is connected between the movable part and the support structure.
3a. An actuator assembly according to clause 2a, wherein the one or more SMA wires are configured, on contraction, to lift the movable part off the first friction surface and onto the bearing arrangement.
4a. An actuator assembly according to clause 1a, wherein the biasing arrangement is comprised by the movable part or by the support structure so as to move with the movable part or remain static relative to the support structure, and is arranged to apply the normal force only in a direction perpendicular to the range of movement at any position within the range of movement
5a. An actuator assembly according to clause 1a or 4a, wherein the movable part comprises two portions that are coupled via the biasing arrangement or wherein the support structure comprises two portions that are coupled via the biasing arrangement.

6a. An actuator assembly according to clause 5a, wherein the bearing arrangement bears movement of one portion of the support structure or movable part, and wherein the first or second friction surface is provided on the other portion of the support structure or movable part.

7a. An actuator assembly according to clause 5a or 6a, comprising and endstop formed between the two portions of the movable part or between the two portions of the support structure.

8a. An actuator assembly according to clause 7a, wherein the one or more SMA wires are configured, on contraction, to disengage the friction surfaces and to engage the endstop.

9a. An actuator assembly according to any one of clauses 5a to 8a, wherein the one or more SMA wires are connected to the other portion of the support structure or movable part.

10a. An actuator assembly according to any one of clauses 5a to 9a, wherein the other portion of the movable part is formed integrally with the biasing arrangement.

11a. An actuator assembly according to any one of clauses 1a to 10a, wherein the biasing arrangement comprises a resilient element.

12. An actuator assembly according to clause 11, wherein the biasing arrangement comprises one or more flexures.

13a. An actuator assembly according to any one of clauses 1a to 12a, wherein the one or more SMA wires are arranged, on contraction, to load the bearing arrangement.

14a. An actuator assembly according to any one of clauses 1a to 13a, wherein the bearing arrangement comprises a rolling bearing, the rolling bearing comprising a support bearing surface on the support structure, a movable bearing surface on the movable part and a rolling bearing element arranged between the support bearing surface and the movable bearing surface.

15a. An actuator assembly according to clause 14a, wherein the support bearing surface and movable bearing surface are parallel to the first and second friction surfaces.

16a. An actuator assembly according to any one of clauses 1a to 13a, wherein the bearing arrangement comprises a plain bearing formed between an engaging surface on the support structure in engagement with a corresponding engaging surface on the movable part.

17a. An actuator assembly according to any one of clauses 1a to 17a, wherein the bearing arrangement is separate from the first and second friction surfaces.

18a. An actuator assembly according to any one of clauses 1a to 17a, wherein the ratio of the static frictional force to weight of the movable part is greater than 1, preferably greater than 3, further preferably greater than 5.

19a. An actuator assembly according to any one of clauses 1a to 18a, wherein the coefficient of static friction between the first and second friction surfaces is in the range between 0.05 and 0.6, preferably in the range between 0.1 and 0.4.

20a. An actuator assembly according to any one of clauses 1a to 19a, wherein the one or more SMA wires apply forces to the movable part that are angled relative to the first and second friction surfaces.

21a. An actuator assembly according to any one of clauses 1a to 20a, wherein the one or more SMA wires are angled relative to the first and second friction surfaces.

22a. An actuator assembly according to any one of clauses 1a to 21a, wherein the one or more SMA wires are angled with respect to one or more directions of movement of the movable part relative to the support structure.

23a. An actuator assembly according to any one of clauses 1a to 22a, wherein the one or more SMA wires comprise at least two opposing SMA wires arranged, on contraction, to both reduce the normal force between first and second friction surfaces, and to move the movable part in opposite directions within the range of movement.

24a. An actuator assembly according to any one of clauses 1a to 23a, wherein the bearing arrangement constrains movement of the movable part relative to the support structure to movement in three degrees of freedom.

25a. An actuator assembly according to clause 24a, wherein the bearing arrangement constrains movement of the movable part relative to the support structure to movement in a movement plane.

26a. An actuator assembly according to any one of clauses 1a to 23a, wherein the bearing arrangement constrains movement of the movable part relative to the support structure to movement in one degree of freedom.

27a. An actuator assembly according to clause 26a, wherein the bearing arrangement constrains movement of the movable part relative to the support structure to helical movement about a helical axis.

28a. An actuator assembly according to clause 26a, wherein the bearing arrangement constrains movement of the movable part relative to the support structure to translational movement along a movement axis or rotational movement about a rotation axis.

The invention claimed is:

1. An actuator assembly comprising:
a support structure comprising a first friction surface;
a movable part comprising a second friction surface engaging the first friction surface;
one or more shape memory alloy (SMA) wires arranged, on contraction, to move the movable part relative to the support structure to any position within a range of movement; and
a biasing arrangement arranged to bias the first and second friction surfaces against each other with a normal force, thereby generating a static frictional force that constrains the movement of the movable part relative to the support structure at any position within the range of movement when the one or more SMA wires are not contracted,
wherein the one or more SMA wires are arranged, on contraction, to reduce the normal force between the first and the second friction surfaces.

2. The actuator assembly according to claim 1, wherein:
the movable part comprises two portions that are coupled via the biasing arrangement; or
the support structure comprises two portions that are coupled via the biasing arrangement.

3. The actuator assembly according to claim 1, wherein the biasing arrangement is connected between the movable part and the support structure.

4. The actuator assembly according to claim 1, wherein the biasing arrangement comprises a resilient element.

5. The actuator assembly according to claim 1, wherein the actuator assembly comprises a bearing arrangement for bearing movement of the movable part relative to the support structure, optionally wherein the biasing arrangement is arranged to load the bearing arrangement.

6. The actuator assembly according to claim 5, wherein the one or more SMA wires are arranged, on contraction, to lift the movable part off the first friction surface such that the movable part bears on the bearing arrangement.

7. The actuator assembly according to claim 6, wherein the one or more SMA wires are configured, on contraction, to lift the movable part off the first friction surface and onto the bearing arrangement.

8. The actuator assembly according to claim 2, wherein:
the actuator assembly comprises a bearing arrangement for bearing movement of the movable part relative to the support structure, optionally wherein the biasing arrangement is arranged to load the bearing arrangement;
the bearing arrangement is provided on one portion of the support structure or movable part; and
the first or second friction surface is provided on the other portion of the support structure or movable part.

9. The actuator assembly according to claim 8, wherein the one or more SMA wires are coupled to the other portion of the support structure or movable part.

10. The actuator assembly according to claim 5, wherein the one or more SMA wires are arranged, on contraction, to load the bearing arrangement.

11. The actuator assembly according to claim 5, wherein the bearing arrangement comprises a rolling bearing, the rolling bearing comprising;
a support bearing surface on the support structure;
a movable bearing surface on the movable part; and
a rolling bearing element arranged between the support bearing surface and the movable bearing surface.

12. The actuator assembly according to claim 5, wherein the bearing arrangement comprises the first and second friction surfaces.

13. The actuator assembly according to claim 5, wherein the bearing arrangement constrains movement of the movable part relative to the support structure to movement in three degrees of freedom.

14. The actuator assembly according to claim 5, wherein the bearing arrangement constrains movement of the movable part relative to the support structure to movement in one degree of freedom.

15. The actuator assembly according to claim 1, wherein the one or more SMA wires are arranged, on contraction, to reduce the normal force between first and second friction surfaces by at least 10%.

16. The actuator assembly according to claim 1, wherein the one or more SMA wires are arranged, on contraction, to disengage the first and second frictional surfaces.

17. The actuator assembly according to claim 1, wherein the one or more SMA wires are arranged, on contraction, to lift at least a portion of the movable part into engagement with an endstop.

18. The actuator assembly according to claim 17, wherein the endstop is arranged on another portion of the movable part.

19. The actuator assembly according to claim 1, wherein the ratio of the static frictional force to weight of the movable part is greater than 1.

20. The actuator assembly according to claim 1, wherein the one or more SMA wires apply forces to the movable part that are angled relative to the first and second friction surfaces.

* * * * *